US007349878B1

(12) United States Patent
Makivic

(10) Patent No.: US 7,349,878 B1
(45) Date of Patent: Mar. 25, 2008

(54) SIMULATION METHOD AND SYSTEM FOR THE VALUATION OF DERIVATIVE FINANCIAL INSTRUMENTS

(75) Inventor: Miloje S. Makivic, Arlington, MA (US)

(73) Assignee: Options Technology Company, Inc., Moscow, ID (US)

( * ) Notice: Subject to any disclaimer, the term of this patent is extended or adjusted under 35 U.S.C. 154(b) by 0 days.

(21) Appl. No.: 09/567,346

(22) Filed: May 9, 2000

Related U.S. Application Data

(63) Continuation-in-part of application No. 08/911,252, filed on Aug. 15, 1997, now Pat. No. 6,061,662.

(60) Provisional application No. 60/024,100, filed on Aug. 16, 1996.

(51) Int. Cl.
*G06Q 40/00* (2006.01)
(52) U.S. Cl. .................................. 705/37; 705/36 R
(58) Field of Classification Search ............ 705/35–38, 705/8, 10, 1; 706/19, 23, 30; 345/339, 733
See application file for complete search history.

(56) References Cited

U.S. PATENT DOCUMENTS

| | | | |
|---|---|---|---|
| 5,148,365 A | | 9/1992 | Dembo |
| 5,168,161 A | | 12/1992 | Markandey |
| 5,301,118 A | * | 4/1994 | Heck et al. ................ 700/109 |
| 5,334,833 A | * | 8/1994 | Case et al. ................ 250/269.1 |
| 5,479,576 A | * | 12/1995 | Watanabe et al. ............ 706/25 |
| 5,563,783 A | * | 10/1996 | Stolfo et al. .................. 705/8 |
| 5,594,918 A | | 1/1997 | Knowles et al. |
| 5,608,620 A | * | 3/1997 | Lundgren ...................... 705/1 |
| 5,692,233 A | | 11/1997 | Garman |
| 5,699,271 A | * | 12/1997 | Sagawa et al. ............... 716/20 |

(Continued)

FOREIGN PATENT DOCUMENTS

EP          0555524 A2 *   5/1992
JP    02001067409 A  *   3/2001

OTHER PUBLICATIONS

Wikipedia; http://en.wikipedia.org/wiki/monte_carlo_me; "Monte Carlo Method" and "Underlying"; Jun. 11, 1915-Oct. 17, 1999; pp. 1-42.*

(Continued)

*Primary Examiner*—Ella Colbert
(74) *Attorney, Agent, or Firm*—Allen, Dyer, Doppelt, Milbrath & Gilchrist, P.A.

(57) ABSTRACT

A Monte Carlo system and method are presented for the pricing of financial instruments such as derivative securities and for assisting a user in making an investment decision using the output of the system and method. A path-integral approach is described that relies upon the probability distribution of the complete histories of an underlying security. A Metropolis algorithm is used to generate samples of a probability distribution of the paths (histories) of the security. Complete information on the derivative security is obtained in a single simulation, including parameter sensitivities. Multiple values of parameters are also obtained in a single simulation. The method is applied in a plurality of systems, including a parallel computing environment and an online real-time valuation service. The method and system also have the capability of evaluation American options using Monte Carlo methods.

32 Claims, 5 Drawing Sheets

U.S. PATENT DOCUMENTS

| | | | | |
|---|---|---|---|---|
| 5,745,385 | A | * | 4/1998 | Hinsberg et al. ............... 703/12 |
| 5,799,287 | A | | 8/1998 | Dembo |
| 5,940,810 | A | | 8/1999 | Traub et al. |
| 5,950,176 | A | * | 9/1999 | Keiser et al. ................. 705/37 |
| 6,021,397 | A | * | 2/2000 | Jones et al. ................... 705/36 |
| 6,061,662 | A | * | 5/2000 | Makivic ....................... 705/36 |
| 6,456,982 | B1 | * | 9/2002 | Pilipovic ..................... 705/36 |
| 6,640,191 | B1 | * | 10/2003 | Deem et al. .................. 702/19 |

OTHER PUBLICATIONS http://www.taygeta.com/rwalks/node5; "Monte Carlo Integration"; Jan. 9, 1996; pp. 12-26.* http://www.riskglossary.com/articles/black_1976; "Black (1976) Option Pricing Formula"; 1996; entire document.*

Clifford A. Ball and Antonio Romo; "Stochastic Vollatility Option Pricing"; The Journal of Finance and Quantitative Analysis; vol. 29; No. 4; Dec. 1994; pp. 589-606.*

Louis O. Scott; "Option Pricing when the Variance Changes Randomly: Theory, Estimation and an Application"; The Journal of Financial and Quantitative Analysis; vol. 22, No. 4; Dec. 1987; pp. 419-438.*

James and James. *Mathematics Dictionary*. 5th ed. New York: Chapman & Hall, 1992.

Magee Jr., Dail, et al., eds. *Computer Dictionary*. 3rd ed. Redmond, Washington: Microsoft Press, 1997.

Shreider, I.U.A. and N.P. Buslenko, eds. *The Monte Carlo Method: The Method of Statistical Trials*. New York: Pergamon Press, 1966.

Downes, John and Jordan E. Goodman. *Dictionary of Finance and Investment Terms*. 4th ed. Hauppauge, New York: Barron's, 1995.

* cited by examiner

SIMULATION METHOD AND SYSTEM FOR THE VALUATION OF DERIVATIVE FINANCIAL INSTRUMENTS

CROSS-REFERENCE TO RELATED APPLICATION

This application is a continuation-in-part of application Ser. No. 08/911,252 filed Aug. 15, 1997, now U.S. Pat. No. 6,061,662, which itself claimed priority from provisional application 60/024,100, "Simulation Method and System for the Valuation of Derivative Financial Instruments," filed on Aug. 16, 1996.

BACKGROUND OF THE INVENTION

1. Field of the Invention

The present invention relates to methods and systems for simulating a financial parameter and, more particularly, to methods and systems for simulating securities valuations and for assisting a user in making an investment decision.

2. Description of Related Art

The introduction of quantitative analysis methods into the financial services arena has become attractive to market participants. However, all but the largest users are forced to use simple techniques, because of prohibitively expensive software and hardware. In addition to cost, investors must learn how to install, use, and maintain proprietary software and frequently must purchase different software for different investment or risk management tasks.

At present, theoretical pricing models are used as market benchmarks. Traders use the models to obtain implied volatilities from current market prices. They may combine implied parameters with historical analysis. Then they use the model with these parameters to construct hedges with respect to various parameters and to predict option price movements as the stock prices move in the short run. The models are also used to consistently price new options with respect to actively traded ones. This can be done quickly only using analytical methods, but the analytical methods are very restrictive and even outright wrong in their assumptions about how the markets work. Numerical methods are much more flexible, but are much slower, particularly when sensitivities and multiple scenarios must be evaluated.

Monte Carlo simulation is a technique for estimating the solution of a numerical mathematical problem by means of an artificial sampling experiment. This is an established numerical method for the valuation of derivative securities. Its major strength is flexibility, and it may be applied to almost any problem, including history-dependent claims or empirically characterized security processes.

The major disadvantage of Monte Carlo simulation is speed, as the accuracy of the method improves as the square root of the number of independent samples generated in a simulation. However, because of sample independence, the method is highly parallel and is thus ideally suited for implementation with scalable parallel-processing architectures. The use of MPP permits a speed increase by a factor up to the number of processors.

The Monte Carlo approach introduced by Boyle (*J. Fin. Econ.* 4, 323-38, 1977) relies on direct stochastic integration of the underlying Langevin equation. Given a security price at a first time, a new price for a subsequent second time is generated at random according to the stochastic process of the security. Results are obtained by averaging over a large number of realizations of the process.

High-performance computing and communications (HPCC), and, in particular, cooperative, distributed, and parallel computing, are expected to play an increasingly important role in trading, financial engineering, and all aspects of investment and commercial banking. The convergence of a number of factors are at present, and are anticipated to continue, causing significant changes in the way in which financial transactions are implemented. Such factors include:

Increased volatility due to globalization of financial markets;
Global distribution of data sources;
Increased complexity of derivatives and other risk management vehicles;
Increased demand for real-time investment and asset allocation decision support;
Increased volume of raw data and need to process large databases;
Increased volume on the retail side of the spectrum, mainly due to on-line technologies (e.g., the Internet and the World Wide Web).

High-performance computing technologies are becoming indispensable in the application domains such as:

Derivative valuation, particularly over-the-counter products;
Portfolio optimization and asset allocation;
Hedging of portfolios in real time;
Arbitrage trading;
Risk analysis simulations.

Traditionally, these applications supported the wholesale end of the financial services spectrum and the supply side. It is believed that there is opportunity for HPCC being created by the emergence of global computer networks as a new delivery channel and economic force. For example, the Internet is creating a shift among financial services providers towards the retail end of the spectrum. At the same time, there is increased demand on the buy side, particularly among corporate treasurers, for more structured and more complex financial instruments to manage risk with more flexibility.

This demand is going to grow with the trend towards globalization, which will be reflected in increased short-term volatility and risk exposure for all market participants. Investors at all levels of endowment are becoming more self-reliant for investment decisions and more comfortable with technology. It is believed that this trend will be reinforced by the wealth of information offered to the public as well as value-added networks. Finally, there is increased pressure from regulators to enact sophisticated risk management strategies for institutional investors, given well-publicized recent events involving financial catastrophes. It is believed that these factors will contribute to an increased demand for on-line services in two areas:

Resources for risk management support;
Resources for investment decision support.

It is believed that these trends will lead to pervasive deployment of scalable high-performance architectures to support market demands.

SUMMARY OF THE INVENTION

It is therefore an object of the invention to provide a method and system for performing online, network-based quantitative analysis and derivative valuation for market participants.

It is another object to provide such a method and system that includes an online option pricing system.

It is a further object to provide such a method and system capable of performing a plurality of statistical analyses of historical data.

It is an additional object to provide such a method and system capable of computing an implied volatility.

It is also an object to provide such a method and system that comprises a user-friendly interface for permitting a user with limited market sophistication to perform simulations based on historical data and a choice of option strategies.

It is yet another object to provide such a method and system that permits the user to obtain a complete solution of a derivative security valuation problem in a single simulation.

It is yet a further object to provide such a method and system for computing sensitivities to model parameters in a single pass.

It is yet an additional object to provide such a method and system to evaluate American options.

It is also an object to provide such a method and system to evaluate with Monte Carlo methods derivative securities with interest-rate-structure-dependent underlying assets.

Another object is to provide a user with simulation data useful in assisting the user in making an investment decision.

These objects and others are achieved by the system and method of the present invention. The system is for deriving an option price and a sensitivity to an input parameter on an underlying asset and comprises software means installable on a computer that comprises means for accessing a database of underlying asset dynamics (e.g., for hedging purposes, historical asset data are used) and historical asset data and means for performing stochastic statistical sampling on the historical asset data for an option based upon the input parameter to derive an option price in a single simulation. The system further comprises means for outputting the derived option price and the sensitivity to the user. The derived option price and sensitivity are useful in assisting the user to make an investment decision.

The software means is for applying the stochastic technique in a parallel computing environment for pricing the financial vehicle. The stochastic technique preferably comprises a Monte Carlo approach, and is in a particular embodiment applied to the problem of pricing derivative securities. The method is in an exemplary embodiment based on a probability function for the complete history of the underlying security, although this is not intended to be limiting. Also a path-integral approach is preferably utilized, which is believed to be particularly suitable for implementation in a parallel or distributed computing environment.

In a particular embodiment, the database further comprises parameters of a plurality of asset probability distributions, and the sampling is performed thereon.

A commercial product resulting from this invention comprises a full-service quantitative analysis resource center (QUARC). The center comprises sophisticated quantitative analysis capability, implemented on a massively parallel machine or a scalable parallel machine. In a particular embodiment the center is delivered to a user on a computer platform using network technology.

An online option pricing service is a component of the resource center, at the core of which is a Monte Carlo simulation algorithm. This algorithm is among the most flexible and is capable of pricing any kind of option. The algorithm has a unique feature in that it can compute all the parameter sensitivities of an option price in a single simulation without resorting to numerical differentiation. An accurate determination of price sensitivities is desirable for a practical trading or hedging strategy, again to assist the user in making an investment decision. The algorithm can also accept any kind of stochastic process for the underlying assets. Furthermore, option values and sensitivities can be computed for multiple values of parameters in a single simulation, which is a feature not replicatable by any other known method. This is useful for risk management purposes, where multiple scenarios may be superimposed on top of option valuation to establish best/worst-case exposures and other risk assessment tasks mandated by internal policies or regulators. The algorithm is also a valuable tool for sell-side firms, where it can be used as a flexible engine for the valuation of exotic one-of-a-kind derivative instruments. From an implementation point of view, the algorithm scales efficiently even on massively parallel processors; so it can take full advantage of the processing power of the machine.

An architecture for the system may in an exemplary embodiment comprise a user's workstation, which typically would include a processor and storage, input, and output means. The workstation would also preferably comprise means for accessing a network such as the Internet. All of these means are in electronic communication with the processor, and the storage means has resident thereon the software as described above. The network-accessing means are used to access a database of historical asset data, which are utilized to perform a stochastic statistical sampling simulation on an input parameter entered by the user via the input means.

The simulation yields a value such as a derived option price to the user via the output means. The value is useful in assisting the user to make an investment decision.

Another, preferable embodiment of the present invention comprises a computation center such as described above, having a processor, storage means, and network accessing means, both in electronic communication with the processor. In this embodiment the software means is resident on the storage means of the computation center, and a desired simulation is performed when a user accesses the center, such as via a network, to request the simulation and provide an input parameter. The center's processor initiates an accessing of the historical asset database, whether resident on its own storage means or accessible via a network, performs the desired simulation, and provides an output to the user, which is useful in assisting the user in making an investment decision.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
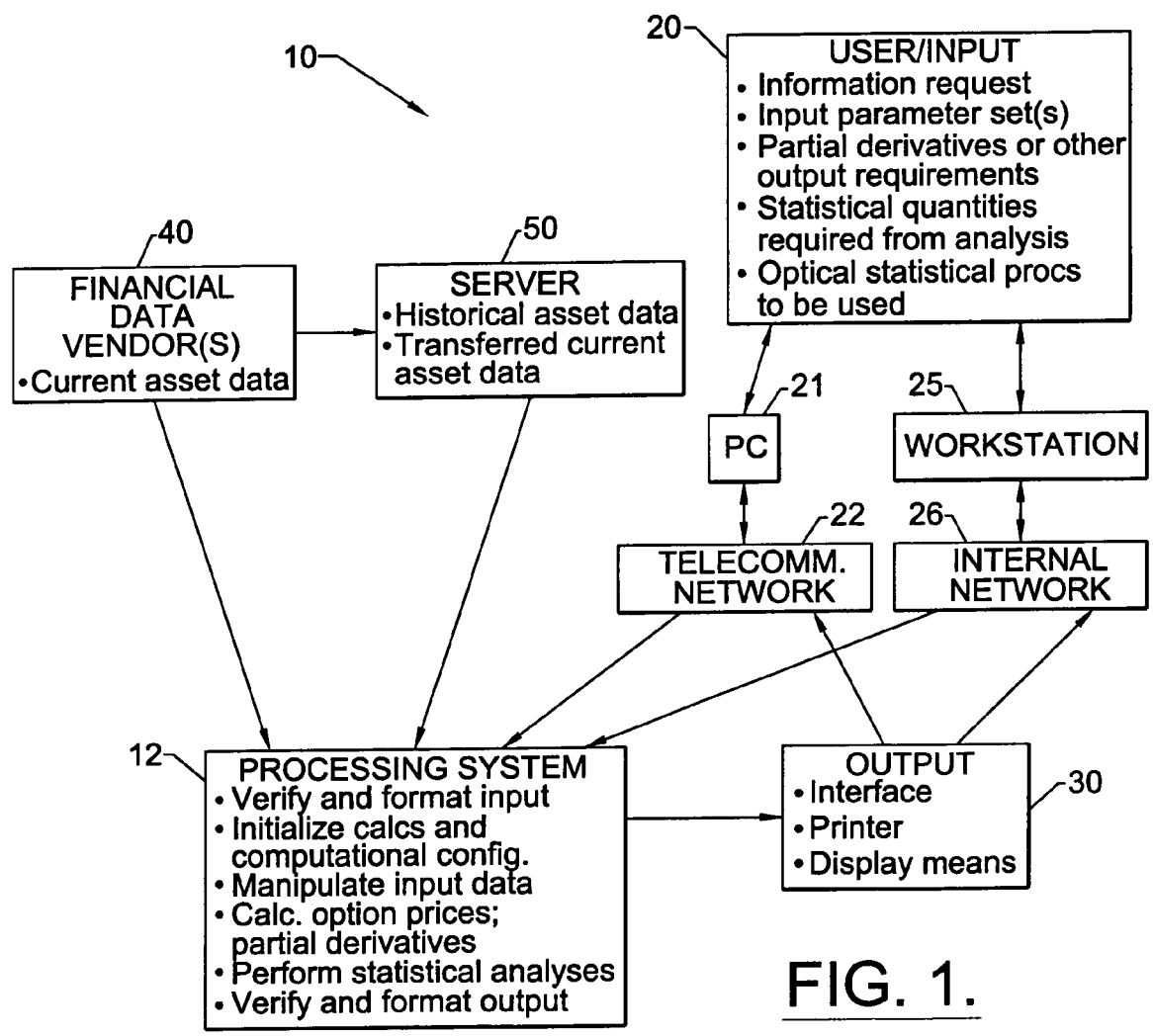
FIG. 1 schematically illustrates an exemplary architecture of the parallel derivative valuation server.

A detailed description of preferred embodiments of the invention will now be presented with reference to FIGS. 1-5.

I. Theoretical Basis for the Method and System

A. Path Integral Monte Carlo Method

Monte Carlo methods in financial calculations can be based on the risk-neutral valuation approach of Cox and Ross (*J. Fin. Econ.* 3, 145-66, 1976). Consider a derivative security that depends on an N-dimensional vector of state variables, $\Theta=(\theta_1, \theta_2, \ldots, \theta_i, \ldots, \theta_N)$. The state vector $\Theta$ is assumed to follow an arbitrary Markov process. Current time is set to t=0, and the expiration date of the contract is at t=T. It will be assumed first for the sake of simplicity that the contract is European. Implementation of American contracts will be discussed in the following.

The riskless short-term interest rate at time t will be denoted by r(t). The risk-neutral probability density of the final state vectors at time T is given by the conditional probability distribution $P(\Theta(T)|\Theta(0))$. Let $t_i$, i=1, ..., M, denote a set of intermediate time slices, such that $0 < t_1 < t_2 < \ldots < t_M < T$. To simplify notation, we will denote these time slices using their indices only, i.e., $t_i = i$. Application of the Chapman-Kolmogorov equation for Markov processes (A. Papoulis, *Probability, Random Variables and Stochastic Processes*, McGraw-Hill, 1984) leads to a recursive determination of P:

$$P(\Theta)(T)|\Theta(0)) = \int d\Theta(M) \ldots \int d\Theta(2) \int d\Theta(1) P(\Theta(T)|\Theta(M)) \ldots P(\Theta(1)|\Theta(0)) \quad (1)$$

We will call the collection of state vectors $$\Omega = (\Theta(0), \Theta(1), \ldots, \Theta(T)) \quad (2)$$

a "path" followed by the state variables. This is analogous to the path integrals as described by Richard Feynman (*Rev. Mod. Phys.* 20(2), 367, 1948) and Norbert Weiner (*Proc. Natl. Acad. Sci.* 7, 253, 1922; *J. Math. Phys.* 2, 131, 1923; *Proc. Lond. Math. Soc.* 22, 434, 1924; ibid., 55, 117, 1930). For any finite number of time slices, a path may be regarded as a point in an $\Re^{(M+2) \times N}$ space, which will be called the "path space." The payoff of the derivative security, $F(\Omega)$, is a real-valued function on the path space. We will use the following shorthand notation for the multiple integral:

$$\int d\Theta(T) \ldots \int d\Theta(M) \ldots \int d\Theta(2) \int d\Theta(1) = \int D\Omega \quad (3)$$

With these conventions, the valuation formula for the price of Q of a European contract with payoff function can be written in a "path integral" notation:

$$Q = \int D\Omega F(\Omega) P(\Omega) \exp\left(-\int_0^T r(t) dt\right) \quad (4)$$

where, by definition, the probability of a path is:

$$P(\omega) = P(\omega(T)|\Theta(M)) P(\Theta(M)|\Theta(M-1)) \ldots P(\Theta(2)|\Theta(1)) P(\Theta(1)|\Theta(0)) \quad (5)$$

Path probability is expressed in terms of a product of probabilities associated with "short-term" segments (time slices) of a path. By tuning the number of time slices, one can simulate arbitrary Markov processes with desired accuracy. Jump processes (see Merton, *J. Fin. Econ.* 3, 125-44, 1976), nonstationary stochastic processes, or empirical probability distributions of security returns can be readily incorporated into the path integral framework.

The interpretation of Eq. (4) is straightforward: One is summing over payoffs $F(\Omega)$ of all possible paths of the state vector from the beginning of the contract until its expiration, weighted by the probability $P(\Omega)$ of an occurrence of a particular path. The basic idea of a Monte Carlo approach is that this summation can be performed stochastically by generating paths at random and accumulating their payoffs. Major contributions to the integral come from relatively small parts of the otherwise huge path space. Therefore, to evaluate the multidimensional integral (4) efficiently, it is essential to sample different regions of the path space according to their contribution to the integral, i.e., to perform importance sampling (Hammersly and Handscomb, *Monte Carlo Methods*, Methuen, London, 1964). If a discrete set of L paths $\Omega_v$, v=1, ..., L, is drawn according to its probability of occurrence, $P(\Omega)$, the integral (4) may be approximated by:

$$\langle Q \rangle_{MC} = \frac{1}{L} \sum_{v=1}^{L} Q(\Omega_v) \quad (6)$$

and the error can be controlled by increasing the size of the sample, since, for large sample sizes, the central limit theorem assures that $$<Q>_{MC} = Q + O(L^{-1/2}) \quad (7)$$

B. Metropolis Algorithm

Before we describe the advantages of promoting complete paths to be the fundamental objects of a Monte Carlo simulation, we shall describe the Metropolis method for generating the probability distribution of the paths, to be able to take advantage of importance sampling. The Metropolis method constructs a Markov process in the path space, which asymptotically samples the path probability distribution. This process is not related to the Markov process that governs the evolution of the state variables. Being a formal device to obtain the desired distribution, there is a lot of freedom in constructing this process, which will prove advantageous for variance reduction techniques.

The Markov process will be defined by the transition probability $W(\Omega_1 \rightarrow \Omega_2)$, which denotes the probability of reaching point $\Omega_2$ starting from $\Omega_1$. There are two restrictions on the choice of the transition probability W. First, the stochastic dynamics defined by W must be ergodic; i.e., every point in the path space must be accessible. The second requirement is that the transition probability must satisfy the "detailed balance condition":

$$P(\Omega_1)W(\Omega_1 \rightarrow \Omega_2) = P(\Omega_2)W(\Omega_2 \rightarrow \Omega_1) \quad (8)$$

These two restrictions do not specify the stochastic dynamics. We shall use the transition probability proposed by Metropolis et al. (*J. Chem. Phys.* 21, 1087-91, 1953), which is known as the Metropolis algorithm.

$$W(\Omega_1 \rightarrow \Omega_2) = \begin{cases} P(\Omega_2)/P(\Omega_1)), & \text{if } P(\Omega_1) \geq P(\Omega_2) \\ 1, & \text{if } P(\Omega_1) < P(\Omega_2) \end{cases} \quad (9)$$

It has been proved (Negele and Orland, *Quantum Many-Particle Systems*, Addison Wesley, New York, 1988) that this Markov chain asymptotically samples the desired distribution P(Q), which is the asymptotic probability distribution of the points generated by the random walk $$P(\Omega) = \lim_{n \rightarrow \infty} P_n(\Omega) \quad (10)$$

One can view the evolution of the original probability distribution along the Markov chain as a relaxation process towards the "equilibrium distribution," $P(\Omega)$. In practice, one assumes that the relaxation occurs within a Markov chain of finite length R. The actual number R is usually determined by experimenting, and depends on both probabilities P and W and the desired accuracy of the simulation. Given P and W, R has to be chosen large enough that the systematic error due to the deviation from the true distribution is smaller than the statistical error due to the finite size of the sample (see Eq. 7). In applications with a large number of strongly coupled degrees of freedom, the relaxation process is nontrivial. For our present purpose, the state vector is low dimensional, and relaxation occurs within just a few steps along the Markov chain. One of the major pitfalls of the Metropolis method is the possibility of being trapped in the vicinity of a metastable state in the phase space. Fortunately it is not a serious concern in this case, again because of the low dimensionality of our problem.

The prescription for a practical algorithm can now be summarized as follows:

1. Pick an arbitrary initial path.
2. Generate a new trial path.
3. The new path is accepted with probability W. Specifically, if $W \geq 1$, the new path is accepted without further tests. If $W<1$, a random number between 0 and 1 is generated, and the new path is accepted if the random number is smaller than W. If the trial path is accepted, it becomes the current path Q.
4. If we progressed enough along the Markov chain so that the relaxation is completed (i.e., $v \geq R$), the current path is sampled from the desired distribution $P(\Omega)$. We compute the payoff function for the current path $F(\Omega_v)$ and accumulate the result (see Eqs. 4 and 6), $A=A+F(\Omega_v)$.
5. Perform an estimate of the statistical errors due to a Monte Carlo sampling procedure. If the error is above a desired level of accuracy, go to (2); otherwise, go to (6).
6. Compute Monte Carlo estimates of the required integrals. If L denotes the last value of the step index v, and R is the number of relaxation steps, the total number of Monte Carlo measurements is $M_v = L - R$. The Monte Carlo estimate of the option price $\langle Q \rangle_{MC}$, given the payoff function F, is obtained to be:

$$\langle Q \rangle_{MC} + \frac{A}{M_v} = \sum_{v=R+1}^{L} F(\Omega_v) \quad (11)$$

The error estimate requires that we also accumulate:

$$\langle Q^2 \rangle_{MC} = \frac{1}{M_v} \sum_{v=r+1}^{L} F^2(\Omega_v) \quad (12)$$

An estimate of the sampling error is obtained as a square root of the variance of the Monte Carlo run:

$$\varepsilon = (\langle \sigma^2 \rangle_{MC})^{1/2} \quad (13)$$
$$\langle \sigma^2 \rangle_{MC} = \frac{1}{M_v}(\langle Q^2 \rangle_{MC} - \langle Q \rangle_{MC}^2)$$

7. Stop.

D. What can be Computed in a Single Simulation?

A very important advantage of the path integral approach is that more information can be obtained in a single simulation than using the standard approach. The basic observation is that all relevant quantities can be expressed as integrals with respect to the path probability distribution.

This is very important for computation of partial derivatives of the contingent claim's price with respect to various parameters. The standard practice is to compute derivatives using numerical differentiation. This approach introduces discretization errors in addition to statistical sampling errors. Numerical differentiation is also computationally expensive, since it requires repeating Monte Carlo simulations for nearby values of parameters. To illustrate the path integral approach, we start from Eq. (4) and denote explicitly the dependence of the price Q(X), the payoff function $F(\Omega,X)$, and path probability $P(\Omega,X)$ on a parameter X:

$$Q(X) = \int D\Omega F(\Omega,X) P(\Omega,X) \quad (14)$$

We have absorbed the present-value discount factor, $$\exp\left[-\int_0^T r(t)dt\right],$$

into the definition of the payoff function $F(\Omega,X)$.

The desired partial derivative is given by:

$$\frac{\partial Q(X)}{\partial X} = \int D\Omega \left(\frac{\partial F(\Omega, X)}{\partial X} + F(\Omega, X)\frac{\partial \ln P(\Omega, X)}{\partial X}\right) P(\Omega, X) \quad (15)$$

Therefore, a Monte Carlo estimate of a partial derivative $\partial Q(X)/\partial X$ of the price may be computed in the same Monte Carlo run as the price Q itself, by accumulating (see Eq. 11):

$$\frac{\partial Q(X)}{\partial X} = \frac{1}{M_v} \sum \left(\frac{\partial F(\Omega_v, X)}{\partial X} + F(\Omega_v, X)\frac{\partial \ln P(\Omega_v, X)}{\partial X}\right) \quad (16)$$

The derivative of the path probability ln $P(\Omega,X)$ is a sum of contributions coming from individual time slices (see Eq. 5):

$$\frac{\partial \ln P(\Omega_v, X)}{\partial X} = \sum_{i=0}^{T-1} \frac{\partial \ln P(\Theta(i+1) | \Theta(i), X)}{\partial X} \quad (17)$$

If the parameter X is the initial stock price or the strike price, this expression simplifies considerably, since only the first or last time slice appears in the sum. Equation (17) implies that contributions from different time slices are independent. This is an important source of parallelism that can be exploited on a concurrent processor (see Section I.G). As a result, term structure contributions to the probability distribution are conveniently included as simply another input parameter.

Following Ferrenberg and Swendsen (*Phys. Rev. Lett.* 61, 2635-38, 1988), a knowledge of the path probability function may be used to obtain results for a different probability distribution. In practice, this means that within a single Monte Carlo simulation with a particular fixed set of parameters (e.g., initial stock price, volatility, exercise price), we can compute results corresponding to other sets of parameters that are close to the one used in the simulation. Let us denote the parameters used in the simulation by a vector X. Let us also denote a different parameter vector by Y. Then:

$$Q(Y) = \int D\Omega F(\Omega,Y) P(\Omega,Y) \quad (18)$$

which can be rewritten as:

$$Q(Y) = \int D\Omega \frac{F(\Omega, Y) P(\Omega, Y)}{P(\Omega, X)} P(\Omega, X) \quad (19)$$

Thus the change of parameters amounts to a redefinition of the payoff function. This equation implies that by accumulating:

$$Q(Y)_{MC} = \frac{1}{M_v} \sum \frac{F(\Omega_v, Y) P(\Omega_v, Y)}{P(\Omega_v, X)} \quad (20)$$

for a number of different values of parameter vector Y, while running a simulation for a fixed vector X, one can obtain results for a window of parameters without repeating the simulation for each new set of parameters. This feature of path integral Monte Carlo is extremely useful for the computation of American contracts, although this is not intended as a limitation. Practical limitations arise from the need to have efficient importance sampling. If the parameters change too much, so that the true path probability distribution for that choice of parameters is significantly different from the one that is used in the simulation, the benefits of importance sampling are lost. This limits the size of the parameter window that can be scanned with uniform accuracy in a single simulation. An alternate embodiment of the method comprises using Eq. (20) as the basis of a control variate technique.

E. Implementation of American Contracts

Monte Carlo computation proceeds by accumulating payoffs obtained for each simulated path. This property complicates pricing for American contracts, where, at every instant in time, the contract owner has to make a decision whether the contract is worth more exercised or unexercised. Therefore, the payoff function at every time step is not known before the simulation. This is clear from the following recursive equation for American contracts:

$$Q(t, S_t, X) = \max\{f(S_t,X), Q*(t, S_t, x)\} \quad (21)$$

where:

$$Q*(t,S_t,X) = \int dS_{t+\Delta T} Q(t+\Delta t, S_{t+\Delta t}, X) P(S_{t+\Delta t}|S_t) \quad (22)$$

We shall begin with a simple call or put on one underlying. The value $Q(t,S_t,X)$ of an American contract at time t, given by a stock price $S_t$ and strike price X, is equal to the larger of the exercised contract payoff $f(S_t,X)$ or the value of the contract if left alive for the next time slice ($Q*(t,S_t,X)$). The recursion is closed by the boundary condition at the contract expiration date: $Q(T,S_T,X)=f(S_T,X)$. One consequence of Eq. (21) is that there exists a boundary $S_B(t)$ on the security price versus time plane, such that for all paths within the boundary, the contract will be left alive until the expiration, while the paths that cross the boundary are terminated since the contract is exercised. Once this boundary is determined, pricing of American options proceeds in a fashion similar to European options. Paths are generated in exactly the same fashion as for European options, but one has to check whether a path crosses a boundary. The payoff of a path within the boundary is $f(S_T,X)$, while the payoff of a path that crosses the boundary at an earlier time, t<T, is $f(S_t,X)$.

Determination of the boundary is a computationally demanding task. In our present implementation, the boundary is determined recursively starting from the contract expiration date T. If we specialize to an ordinary put or call, the boundary at T is given by the strike price X. If the time slice $\Delta t$ is short enough, it is clear that the location of the boundary at T−1 will be close to X. To determine the location exactly, one has to compute the option price for a number of initial stock prices at T−1, which are close to X, under the assumption that the contract is kept alive for the single time step and compare each of those prices with the payoffs of the same contracts if exercised. This is accomplished efficiently in a single simulation using Eq. (20), while the simulation is centered at the initial stock price $S_{T-1}=X$. Quadratic interpolation is then used to obtain all option prices in the search region. If we denote this quadratic function by $Q^*_2(S)$, the boundary $S_B(T-1)$ is obtained by solving $Q^*_2(S)-f(S,x)=0$. This procedure is repeated for each time slice t<T by centering the search region at $S_B(T+1)$. Depending on the desired accuracy and the size of the time step, this procedure can be repeated starting from the boundary determined in the previous iteration. Once we determine the boundary, we proceed with the computation as for the European contract while keeping track of boundary crossings for payoff accumulation.

We should stress that once a path is generated, the European option price can be easily computed for all time periods to maturity, from t=1 to T. This is not as simple for the American option, since the boundary is different for different time periods to maturity. One must compute and store all the boundaries for all periods to maturity before using a full path generated in the Monte Carlo simulation. A path may be contained within some of the boundaries while crossing the others. It is clear from these considerations that boundary determination is the most expensive part of the computation. The ability of path integral Monte Carlo to compute multiple option prices in a single run is extremely valuable in this context. From a practical viewpoint it is important correctly to set the width of the search region on the next time slice once the boundary is determined at the current time slice. In our present implementation it requires a lot of intervention from the user, although it should be adjusted automatically given the parameters of the simulation.

An alternate embodiment of the method comprises a different approach. Given the falling cost of both primary and secondary storage, it can be advantageous to store all paths generated in a Monte Carlo simulation. A good first guess for the boundary can be made. Since the correct boundary maximizes the contract value, an optimization procedure can be established wherein the stored paths are used to compute the contract value given a boundary, which is then perturbed until the global maximum of the contract value is reached. This approach may be more suitable for parallel machines than the recursive method, which is necessarily sequential across time slices.

F. Sequential Implementation

We now consider the simplest possible valuation problem. We describe in detail a path-integral Monte Carlo evaluation of the price of a European call on a stock following the standard Ito price process with constant volatility. The interest rate is also assumed constant: $r(t)=r_f$. The exact solution is given by the well-known Black-Scholes method (*J. Polit. Econ.* 81, 637-59, 1973). The evolution of the stock price logarithm, y=log S, is given by the stochastic differential equation:

$$d \log S = dy = \mu dt + \sigma d\xi \quad (23)$$

Standard notation is used: μ is the expected return, and σ is the stock price volatility. The stochastic component dξ is a Wiener process with variance dt. In a risk-neutral world, the expected return on the stock is equal to the risk-free interest rate, which requires that $\mu=r_f-\sigma^2/2$. If the stock price logarithm at time t is $y_t$, the risk-neutral probability distribution of the stock price logarithms $y_{t+\Delta t}$ at the instant t+Δt is Gaussian:

$$P(y_{t+\Delta t} \mid y_t) \propto \exp\left(-\frac{(y_{t+\Delta t} - y_t - \mu \Delta t)^2}{2\sigma^2 \Delta T}\right) \quad (24)$$

For this particular stochastic process, Eq. (24) is true for any time interval. For general continuous price processes, the Gaussian form is valid only in the limit Δt→0. The probability of any path $\Omega=(y(0), y(\Delta t), \ldots y(\Delta t), y(T))$, with M time slices, can be written (using simplified notation: n≡nΔt):

$$P(\Omega) = \prod_{n=0}^{M} \exp\left(-\frac{(y(n+1) - y(n) - \mu \Delta t)^2}{2\sigma^2 \Delta t}\right) \quad (25)$$

Note that this distribution is not normalized, but that is irrelevant for the Metropolis algorithm, since only ratios of probabilities matter. The payoff function for the call is given by:

$$F(S(T),X)=(S(T)-x)\Sigma(S(T)-X=(e^{\log y(T)}-X)\Theta(e^{\log y(T)}-X) \quad (26)$$

where X denotes the strike price and Θ(x) is the step function.

Given a path $\Omega=(y(0), y(1), \ldots, y(n), \ldots, y(T))$, we can obtain any other path by a sequence of entirely local steps where we update the value of a stock price at a single time slice n. The new path differs from the old one only by the stock price value at time nΔt: $\Omega'=(y(0), y(1), \ldots, y(n), \ldots y(M), y(T))$. The new value of the stock price logarithm is obtained in the following way: (1) At the beginning of the simulation, we pick an interval of width $\Delta=\lambda\sigma^2\Delta t$. (2) For each update, we pick a random number p, such that −1≦p≦1. The new stock price is y'=y+pΔ. The scale factor λ is chosen by experimentation, so that the acceptance rate of the updated configurations is roughly 0.5.

Following the Metropolis algorithm, we have to accept or reject the new path according to the transition probability W(Ω→Ω'). Combining Eqs. (9) and (26), we obtain the following expression for the transition probability:

$$W(\Omega \to \Omega') = \frac{\Lambda'(n-1, n, n+1)}{\Lambda(n-1, n, n+1)} \quad (27)$$

where $$\Lambda'(n-1, n.n+1) = \quad (28)$$

$$\exp\left(-\frac{y'(n)-y(n-1)-\mu\Delta t)^2}{2\sigma^2 \Delta t} - \frac{(y(n+1)-y'(n)-\mu\Delta t)^2}{2\sigma^2 \Delta t}\right)$$

and $$\Lambda(n-1,n,n+1) = \tag{29}$$

$$\exp\left(-\frac{y(n)-y(n-1)-\mu\Delta t)^2}{2\sigma^2 \Delta t} - \frac{(y(n+1)-y(n)-\mu\Delta t)^2}{2\sigma^2 \Delta t}\right)$$

This local algorithm is applicable to any Markov process. A non-Markov process induces couplings between nonadjacent time slices, and one would design an appropriate algorithm with global updates. Global updates are dependent upon the nature of the stochastic process, and consequently the symmetries of the resultant path probability function. It is desirable to include global updates even for Markov processes in order to reduce the variance of the Monte Carlo simulation. We use a very simple global update for the present problem, based upon the translational invariance of the path probability (i.e., its dependence upon differences of stock price logarithms). When $y_n$ is updated, then $y_k$, n<k≦T are also shifted by the same amount. The transition probability for this move is still given by Eqs. (28) and (29), but without the second term in the exponent, since the probability of the path segment after time slice n is not changed by a rigid shift. This move significantly improves the statistical quality of results for time slices closer to the contract expiration date.

We usually start from a "deterministic" path, i.e., a path given by Eq. (23) with σ=0. We update paths looping over time slices sequentially using both global and local moves. When the whole path is updated, it is counted as one Monte Carlo step. After the relaxation period (which is less than 100 steps), we begin accumulating an option price estimate and its partial derivatives, as described in Sections B and D.

The computation of the option's delta, which measures its price sensitivity, $\delta=\partial Q/\partial S(0)$, requires an accumulation of $A=\partial F/\partial S(0)+F\partial \ln P/\partial S(0)$ during the Monte Carlo run. Since S(0) appears only on the initial time slice and the payoff function does not depend explicitly on S(0), the accumulator reduces to:

$$A = F(S(T),X)\frac{(y(1)-y(0)-\mu\Delta t)}{S(0)\sigma^2 \Delta t} \tag{30}$$

The volatility sensitivity κ is somewhat more complicated, since all the time slice probabilities depend upon σ. The payoff function does not depend upon σ; so $A = F \partial \ln P/\partial\sigma$. Using the explicit expression for path probability, Eq. (25), we obtain:

$$A = \tag{31}$$

$$F(S(T),X)\sum_{n=1}^{T}\frac{y(n)-y(n-1)-\mu\Delta t}{\sigma}\left(\frac{(Y(n)-y(n-1)-\mu\Delta t)}{\sigma^2 \Delta t}-1\right)$$

In this sum, there are only two terms that depend upon the stock price on any given time slice. Therefore, the computation of κ has a constant complexity per Monte Carlo update. Furthermore, only adjacent time slices are coupled in the sum, which is important for an efficient parallel implementation.

Similar expressions are easily derived for interest rate sensitivity ρ. We should note that these equations are not the most efficient way to compute derivatives for this particular problem. By a simple change of variables, one can rewrite the probability function to be independent of σ and S(0), and the complete dependence on these parameters is lumped into the payoff function. However, unlike Eqs. (31) and (32), the resulting expressions cannot be easily generalized to more complicated processes.

We now outline the procedure for computing option prices for multiple initial stock prices in a single simulation with an initial stock price $S(0)=S_0$. Additional stock prices will be designated by $s_j$. Since only the first time slice probability depends upon S(0), it follows from Eqs. (21) and (26) that for each additional option price j, we must accumulate:

$$A_j = F(S(T),X)\exp\left(-\frac{(Y(1)-S_0-\mu\Delta t)^2-(y(1)-S_j-\mu\Delta t)^2}{2\sigma^2 \Delta t}\right) \tag{32}$$

Note that F is independent of the initial price; so the same function F(S(T),X) appears for all indices j.

G. Parallel Implementation

An extrapolation of current trends in high-performance computing indicates that multiple-instruction multiple-data (MIMD) distributed-memory architectures are very cost-effective hardware platforms, although this is not intended as a limitation. Additional parallel configurations comprise single-instruction multiple-data architectures. Further, the system may comprise distributed or shared memory, as well as a network of, for example, personal computers. The architecture thus includes tightly coupled systems as well as networked workstations, which are conceptually similar. The only important difference is that tightly coupled systems have higher communication bandwidths, which means that they can better exploit finer-grain parallelism. We will discuss an implementation of Monte Carlo option pricing on MIMD platforms.

Task parallelism and data parallelism are the two most important paradigms of parallel computation. Task parallel computation can be broken into a number of different tasks running concurrently on different processors. Tasks coordinate their work by exchanging messages. A computational problem is data parallel if a single operation can be applied to a number of data items simultaneously. In this case, the most important parallelization strategy is to distribute data items among the nodes of a parallel processor, which then can apply the operation simultaneously on those data they own. Monte Carlo simulation can be viewed as either task-parallel or data-parallel or both. Depending on the parameters of the pricing problem and the characteristics of the hardware, one may employ either parallelization strategy or both.

The simplest and most effective parallelization strategy is based on task parallelism. It also requires minimal programming effort for porting of a sequential code to a parallel code. A Monte Carlo simulation run can be broken into a number of short runs. These short runs may be viewed as tasks that are assigned and executed on different processors independently. The only time when processors communicate is at the initialization stage and at the very end, when averages from different processors are combined into a single Monte Carlo estimate. If the time required to complete the long run on a single processor is $T_{MC}(1)$ and the number of processors is N, then the time required for a short run is $T_{MC}(1)/N$. If the short runs are executed concurrently on a parallel machine with N processors, the time required for the simulation is $T_{MC}(N)=T_{MC}(1)/N+T_{comm}$, where $T_{comm}$ is the amount of time spent for communications among processors during initialization and global exchange of partial results at the end of the simulation. Parallel speed-up is defined as:

$$S(N) = \frac{T_{MC}(1)}{T_{MC}(N)} = N\frac{1}{1+NT_{comm}/T_{MC}(1)} \quad (33)$$

and parallel efficiency is defined as speed-up per processor:

$$\varepsilon(N) = \frac{S(N)}{N} = \frac{1}{1+NT_{comm}/T_{MC}(1)} \quad (34)$$

The theoretical upper bound for efficiency is 1. It can be achieved only in embarrassingly parallel applications that do not incur any communication or load imbalance overheads. It is clear from the equations that this implementation is efficient as long as $T_{comm}$ is much shorter than the sequential time of a short run. This is usually the case for large- and medium-grain parallel machines. In comparison, any other approach to derivative pricing has much higher communication costs. Explicit finite difference methods require local communication at every time step. This is a very serious limitation for coarse space-time grids on massively parallel machines. The granularity of local computation becomes too small for the communication overhead. The situation is even worse for implicit methods, where collective communication has to be executed at every time step. Binomial approximations are also bound by communication costs and may impose significant memory requirements due to exponential growth of the data set with the number of time slices.

On the other hand, the only situation where task-parallel Monte Carlo fails is in the extreme limit of more processors than total Monte Carlo samples. However, on massively parallel processors one can always exploit the data-parallel nature of the Monte Carlo method. A simple data-parallel domain-decomposition strategy is to divide a path into a number of smaller time intervals (segments), which are in turn assigned to different nodes. Since only adjacent time slices are required to update the stock price on a given time slice, a node will own the information it needs for most of the time slices, except those on the boundaries of the time interval assigned to the node. Each node will update sequentially the time slices it owns (following the same algorithm as described in the previous section), until it encounters one of the boundary slices. At that moment, it will communicate with a neighboring node to obtain the value of the neighbor's boundary time slice. After the communication is completed, it has all the information it needs to update the last time slice. Then the whole sequence is repeated for the next Monte Carlo step. Equations (30), (31), and (32) show that the same divide-and-conquer strategy can be employed for the accumulation of the option price and its parameter sensitivities. This sequence of communications and computations is executed by all nodes simultaneously, which brings a speed-up roughly proportional to the number of path segments.

It follows from Eq. (27) that all even time slices can be updated simultaneously and then all odd time slices can be updated simultaneously. This implies that the highest degree of parallelism can be achieved by having only 2 time slices per node. In practice, the situation is complicated by the fact that exchange of messages between nodes is a much slower operation (sometimes by a factor of $10^2$ or even $10^3$) than a typical floating point operation within a node. This communication overhead varies significantly from one architecture to another and limits the granularity of parallelism on a particular machine. There is an optimal number of time slices per node, which balances local computation and communication costs. Communication overhead is very important for simulations with a small number of time slices running on a networked cluster of workstations, which has large communication latencies. Because of the communication overhead, it is always more efficient to exploit first task parallelism, and then domain decomposition, so that the granularity of local computation is maximized with respect to communication.

This discussion illustrates that the Monte Carlo method is believed to have the best scalability properties among present known option pricing methods. A preferred embodiment comprises implementing the method on massively parallel computers or scalable parallel processors. This feature, combined with the fact that path-integral Monte Carlo simulation provides the most complete solution to the pricing problem, strongly suggests that the path-integral Monte Carlo method is the method of choice in a parallel computing environment.

II. Implementation of the Valuation Method and System

A. Implementation of the Algorithm

The algorithm discussed above may be implemented by explicitly coding the exchange of messages between nodes or to use a high-level data-parallel language that has semantic support for parallelism and hides the complexities of explicit message passing constructs.

The path-integral Monte Carlo code has been implemented in high-performance Fortran (HPF), which is among the most prominent of such languages. HPF is an emerging standard of parallel computation. HPF may be considered a superset of Fortran 90, with a small number of extensions to support effective use of MIMD machines. Data layout is achieved in the following stages:
1. Definition of a template using the TEMPLATE directive. Template is not a true array, just a description of an abstract index space; so there is no memory allocation for the template.
2. Definition of an abstract processor array using the PROCESSORS directive.
3. Alignment of data arrays with the template using the ALIGN directive.
4. Distribution of the template onto the processor array using the DISTRIBUTE directive. All array elements that are aligned with the elements of the template reside on the same processor. Among the possible partitioning patterns are: BLOCK, CYCLIC, and *. BLOCK distributes an array dimension in contiguous blocks, CYCLIC distributes in a round-robin fashion, while * specifies that the array dimension should not be distributed.
5. Mapping of the abstract processor array onto the hardware. This final stage is implementation dependent and is done by the run-time system transparently to the programmer.

The fundamental advantage of this process is that code design is centered around the topology of the physical problem, while the mapping from the problem topology to the hardware topology is done in an optimal fashion by the run-time system.

As an illustration, consider the following lines, which specify how to distribute an array of stock price paths among the processors. The option price is computed for a number of expiration times, volatilities, initial stock prices, and strike prices; so the paths are described by 3D arrays indexed by time step, volatility, and initial stock price. Path arrays are not indexed by strike price, since the computation for different strike prices is done sequentially:

```
INTEGER, PARAMETER:: time_steps=100            !Number of time slices
INTEGER, PARAMETER:: n_prices   =20            !Number of initial stock prices
INTEGER, PARAMETER:: n_vols     =20            !Number of volatilities
INTEGER, PARAMETER:: mc_steps=10000            !Number of Monte Carlo steps
REAL, DIMENSION(time_steps,n_prices,n_vols):: price    !stock price path
INTEGER, PARAMETER:: nt=4, np=4, nv=4          !number of processors assigned to
                                               !dumensions of price array
!HPF$ PROCESSORS proc(nt,np, nv)               !processor array
!HPF$ TEMPLATE, DIMENSION(time_steps,n_prices,n_vols):: temp   ! template
!HPF$ ALIGN price WITH temp                    !align price array with template
!HPF$ DISTRIBUTE temp ONTO proc                !distribute template
```

The second dimension of the price array is used to index different initial stock prices for the simulation. By initializing all of them to the same stock price and by changing a few directives:

```
INTEGER, PARAMETER:: time_steps=100  !Number of time slices
INTEGER, PARAMETER:: n_prices  =20   !Number of initial stock prices
INTEGER, PARAMETER:: n_vols    =20   !Number of volatilities
INTEGER, PARAMETER:: mc_steps=10000/(n_prices) !Number of Monte Carlo steps
REAL, DIMENSION(time_steps,n_prices,n_vols):: price   !stock price path
REAL, DIMENSION(time_steps,n_prices,n_vols):: partial_avg  !partial results
REAL, DIMENSION(time_steps,n_vols):: option_price  !option price array
INTEGER, PARAMETER:: np=8, nv=8      !number of processors assigned to
                                     !dumensions of the price array
!HPF$ PROCESSORS proc(np, nv)        !processor array
!HPF$ TEMPLATE, DIMENSION(n_prices,n_vols):: temp ! template
!HPF$ ALIGN price(*,:,:) WITH temp(:,:)    !collapse onto template
!HPF$ ALIGN Partial_avg(*,:,:) WITH temp(:,:)  !collapse onto template
!HPF$ DISTRIBUTE temp ONTO proc            !distribute template
``` one has effectively converted the computation into a task-parallel one. Partial averages are combined into the final result by a call to the global reduction routine, which is Fortran 90 intrinsic:

option_price(:, :)=SUM(partial_avg(:, :, :), DIM=2)/ n_prices

Implementation in a high-level language like HPF has the added benefits of code modularity, clarity, and simplicity, as well as ease of debugging, maintenance, and portability. The slightly modified HPF code was tested and benchmarked on the following platforms: 32-node Connection Machine CM5, 16000 processor MasPar, 8-node DEC Alpha workstation farm with GIGAswitch, 12-node IBM SP-2 with High-Performance Switch, and a network of Sun workstations. We have also implemented the task-parallel algorithm using the native message-passing library on an IBM SP-2 parallel computer.

B. Functional Specification

The system of the present invention includes an ability to price:
- Options on common stock;
- Equity index options (e.g., S&P 500 and S&P 100);
- Options on financial and commodity futures;
- Options on currencies;
- Certain exotic options with multiple underlying instruments.

This selection covers most classes of options that are not dependent upon the term structure of interest rates, although this is not intended as a limitation.

Further, the system includes means for computing the following derivative price sensitivities:
- Delta (sensitivity to changes in the underlying price);
- Vega (sensitivity to changes in the underlying volatility);
- Rho (sensitivity to changes in the money market rate);
- Theta (sensitivity to the passage of time);
- Phi (sensitivity to the dividend yield for stock options).

This selection, while not intended to be limiting, demonstrates that the system provides complete information about an option without resorting to numerical differencing, which entails errors and requires at least one extra simulation for each sensitivity if conventional algorithms are used.

The system implements the following stochastic processes for the underlying asset:
- Gaussian;
- Cauchy;
- Poisson jump;
- Gaussian and Poisson jump combined;
- Cauchy and Poisson jump combined;
- Histogram of historical returns.

These choices are sufficient to show that the algorithm can accept virtually any model for the underlying dynamics.

The system performs detailed statistical analysis of historical data:
- Histograms;
- Detrending (linear and quadratic trends);
- Correlations;
- Spectral analysis;
- Calculation of moments;
- Moment substitution estimation;
- Weighted historical volatility estimation;
- Robustness statistics;
- Maximum likelihood estimation.

The system provides a range of services, from "quick and dirty" estimation methods, such as moment substitution, to spectral analysis and maximum likelihood estimation for sophisticated users. Statistical analysis tools are also provided for multiple correlated underlying processes, which is not standard.

The system includes means for computing implied volatility and sensitivity with respect to volume, as discussed above, using the Black-Scholes model and current market prices. The user can mix historical and implied volatility to obtain estimates of future volatility. The user can also experiment with volatility in a more sophisticated fashion than with previous known systems, since, in addition to the historical, implied, or mixed volatility estimate, the system implements the following possibilities for volatility dynamics assuming Gaussian and Cauchy processes.

- Geometric random walk stochastic volatility;
- Volatility defined by a generalized autoregressive conditional heteroskedastity (GARCH) process;
- Deterministic time-dependent volatility scenarios;
- Deterministic volatility defined as a polynomial function of underlying price.

These choices for volatility modeling are state-of-the-art and also believed to be impossible to implement by any other known method in a scenario-type analysis.

The system permits the user to specify standard option strategies such as spreads, butterflies, and straddles, using a simple menu-driven graphical user interface. For each strategy, the user obtains expected payoffs and their uncertainties. The system implements default choices whenever feasible, so that a user with limited knowledge of options can obtain sensible and useful answers with minimal inputs.

The system provides two distinct functionalities:
- Historical calibration module;
- Market module.

The historical calibration module enables experimentation with the data in the long-term database. Its purpose is to let the user develop estimates of parameters and to test different option strategies against historical market data. Therefore, the user is able to run and manage "What If?" sessions to develop intuition about the market before attempting to participate.

The market module provides functions to examine and price currently traded contracts, using some of the information supplied by the historical calibration module. The results of the analysis can be displayed in graphical as well as tabular fashion and is stored in the database if requested by the user for future reference.

The front end (user interface) is designed to support both standalone mode and access through a Web browser. An exemplary language in which it is written, although this is not intended as a limitation, is Java, which provides portability, robustness, and security features.

The system implements basic security features such as server and user authentication without data encryption. The system comprises in an alternate embodiment a more comprehensive security model using current standards. If the server is operating behind a firewall, then the basic security features suffice.

The system also implements a logging and accounting scheme.

Utilization of the system has shown that a flexible option pricing environment is feasible, which is enabled by algorithmic features, parallel computer resources, and portable network-friendly implementation. For the user, it is believed that the speed, "What If?" scenario generation, and testing capability are of particular importance and novelty.

The present invention provides the most flexible numerical method known at present while at the same time providing real-time support for pricing, hedging, and strategy development. These capabilities stem from the parallel implementation and the ability of the algorithm to produce the complete information set about an option in a single simulation.

C. Hardware and Software Resources

A block diagram of the system 10 of the present invention (FIG. 1) indicates that the processing system 12 contains software 120 for performing a plurality of functions, including verifying and formatting input, initializing calculations and the computational configuration, manipulating the input data, calculating option prices and partial derivatives, performing statistical analyses, and verifying and formatting output.

The user 20 inputs any of a plurality of requests and/or parameters, including an information request, input parameter set(s), partial derivatives or other output requirements, statistical quantities required from the analysis, and optional statistical procedures to be used. The user 20 may interface the processor 12 by any means known in the art; shown are through a personal computer 21 having input means such as keyboard 210 and mouse 211 and output devices such as a printer 212 and monitor 213. The processor 12 is interfaced via, for example, a modem 214 to a telecommunications network 22 (such as, but not limited to, the World Wide Web). Alternatively, the user 20 may interface by means of a workstation 25 through an internal network 26.

Output from the processor 12 is fed back to the user 20 from an output module 30, such as through an interface to a printer or a display device.

Current asset and other instrument data are obtained from a source, which may include, but is not limited to, a financial data vendor 40. These data may be requested by the processor 12 as needed.

Historical data may be stored on the server 50, from which the processor 12 may request the desired information to perform calculations. Such data may be updated at specified intervals by adding current data to the server 50 by means known in the art.

An exemplary core hardware resource 12 comprises the Maui High-Performance Computing Center (MHPCC) IBM SP-2. Parallel software is implemented in C and MPI to ensure portability across virtually any parallel platform. An exemplary database server 50 comprises Oracle. Calibration may be performed on a node of the SP-2 in a sequential fashion. Hardware and software are included to supply real-time or delayed data feeds from financial data vendors 40 such as Knight-Ridder, Telerate, Bloomberg, Dow, etc. Financial modeling software is also an element of the invention.

In another embodiment, a version of the software 120' may be made resident on a user's computer storage 215 for direct access by the user 20. Typically the user 20 will still need to access a network to access the historical asset database 40 in order to have up-to-date information.

In either case, the output provided to the user 20 can be used to assist in making an investment decision. If the output is not satisfactory, the user 20 can continue performing different simulations as desired.

III. Exemplary Results

A valuation problem of a European call on a stock with constant volatility and no dividends has been undertaken. In this problem the Monte Carlo results can be easily compared with the analytic Black-Scholes solution.

In Table 1 are shown the results for some realistic parameter choices and their accuracy as the number of Monte Carlo steps is varied. Exact results are always within estimated confidence limits of the Monte Carlo results. Statistical errors after 100,000 Monte Carlo steps are less than a half-percent for all maturities. The error is less than a tenth of a percent for $1.6 \times 10^6$ steps. These statistical uncertainties reflect improvements achieved by explicit use of all the symmetries of path probabilities, which enable one to accumulate more independent results per path. For example, if a stock price path is reflected with respect to the deterministic path, its probability is the same; so we can accumulate results for the reflected path as well, with negligible computation cost. This can be regarded as a rudimentary variance reduction technique.

TABLE 1

Comparison of Monte Carlo estimates and exact results for European call values. This table shows the level of accuracy which can be achieved as the number of Monte Carlo steps ranges from $1 \times 10^5$ to $16 \times 10^5$. Risk-free interest rate per period is set to $r_f = 0.004853$. $N_t$ is the number of periods to maturity, $\sigma^2$ is stock price variance per period, C(N) is European call value Monte Carlo estimate after N Monte Carlo steps, and $\epsilon(N)$ is the error estimate after N Monte Carlo steps. Exact results obtained using Black-Scholes formula are listed in the last column (C). Initial stock price is S = 100 and the strike price is X = 100 for all data sets in the table.

| $N_t$ | $\sigma^2$ | $C(1 \times 10^5)$ | $\epsilon(1 \times 10^5)$ | $C(4 \times 10^5)$ | $\epsilon(4 \times 10^5)$ | $C(16 \times 10^5)$ | $\epsilon(16 \times 10^5)$ | C |
|---|---|---|---|---|---|---|---|---|
| 1 | 0.001875 | 1.9792 | 0.0064 | 1.9769 | 0.0032 | 1.9750 | 0.0016 | 1.9761 |
| 2 | 0.001875 | 2.9508 | 0.0106 | 2.9456 | 0.0053 | 2.9430 | 0.0026 | 2.9443 |
| 3 | 0.001875 | 3.7522 | 0.0139 | 3.7492 | 0.0069 | 3.7469 | 0.0034 | 3.7482 |
| 4 | 0.001875 | 4.4710 | 0.0168 | 4.4678 | 0.0083 | 4.4673 | 0.0041 | 4.4675 |

TABLE 1-continued

Comparison of Monte Carlo estimates and exact results for European call values. This table shows the level of accuracy which can be achieved as the number of Monte Carlo steps ranges from $1 \times 10^5$ to $16 \times 10^5$. Risk-free interest rate per period is set to $r_f = 0.004853$. $N_t$ is the number of periods to maturity, $\sigma^2$ is stock price variance per period, C(N) is European call value Monte Carlo estimate after N Monte Carlo steps, and $\epsilon(N)$ is the error estimate after N Monte Carlo steps. Exact results obtained using Black-Scholes formula are listed in the last column (C). Initial stock price is S = 100 and the strike price is X = 100 for all data sets in the table.

| $N_t$ | $\sigma^2$ | $C(1 \times 10^5)$ | $\epsilon(1 \times 10^5)$ | $C(4 \times 10^5)$ | $\epsilon(4 \times 10^5)$ | $C(16 \times 10^5)$ | $\epsilon(16 \times 10^5)$ | C |
|---|---|---|---|---|---|---|---|---|
| 5 | 0.001875 | 5.1446 | 0.0193 | 5.1324 | 0.0096 | 5.1326 | 0.0048 | 5.1327 |
| 6 | 0.001875 | 5.7822 | 0.0216 | 5.7610 | 0.0108 | 5.7608 | 0.0054 | 5.7597 |
| 7 | 0.001875 | 6.3823 | 0.0238 | 6.3599 | 0.0118 | 6.3595 | 0.0059 | 6.3576 |
| 8 | 0.001875 | 6.9456 | 0.0258 | 6.9309 | 0.0129 | 6.9337 | 0.0064 | 6.9324 |
| 9 | 0.001875 | 7.4969 | 0.0276 | 7.4881 | 0.0138 | 7.4875 | 0.0069 | 7.4883 |
| 10 | 0.001875 | 8.0335 | 0.0294 | 8.0259 | 0.0147 | 8.0235 | 0.0073 | 8.0285 |
| 1 | 0.002500 | 2.2467 | 0.0075 | 2.2436 | 0.0037 | 2.2415 | 0.0018 | 2.2411 |
| 2 | 0.002500 | 3.3269 | 0.0123 | 3.3198 | 0.0061 | 3.3168 | 0.0030 | 3.3161 |
| 3 | 0.002500 | 4.2089 | 0.0161 | 4.2024 | 0.0080 | 4.2004 | 0.0040 | 4.1999 |
| 4 | 0.002500 | 4.9935 | 0.0195 | 4.9873 | 0.0097 | 4.9864 | 0.0048 | 4.9848 |
| 5 | 0.002500 | 5.7262 | 0.0224 | 5.7086 | 0.0112 | 5.7085 | 0.0056 | 5.7065 |
| 6 | 0.002500 | 6.4168 | 0.0252 | 6.3873 | 0.0125 | 6.3855 | 0.0062 | 6.3831 |
| 7 | 0.002500 | 7.0602 | 0.0277 | 7.0302 | 0.0138 | 7.0290 | 0.0069 | 7.0255 |
| 8 | 0.002500 | 7.6629 | 0.0301 | 7.6415 | 0.0150 | 7.6434 | 0.0075 | 7.6406 |
| 9 | 0.002500 | 8.2483 | 0.0322 | 8.2351 | 0.0161 | 8.2348 | 0.0080 | 8.2335 |
| 10 | 0.002500 | 8.8169 | 0.0343 | 8.8066 | 0.0172 | 8.8041 | 0.0086 | 8.8075 |

A shortcoming of the Metropolis method is that configurations reached along the Markov chain are correlated, which decreases the effective number of independent measurements. In this simulation, correlations along the Markov chain are reduced by choosing with equal probabilities, at every Monte Carlo step, either the current path or any of its reflection-symmetry-related paths.

In Table 2 are presented results for parameter sensitivities using the same parameter choices as Table 1. They are obtained concurrently with the option price itself, as described above. They show an even higher level of accuracy than the corresponding option price for a given number of Monte Carlo steps. If these values had been obtained with numerical differentiation, it would require at least three simulations besides the original one to compute the three partial derivatives. Additional simulations may also be required, depending upon the statistical accuracy of the Monte Carlo results. If the statistical errors are large, one would need simulations for a few nearby parameter values, combined with a least-squares fit to produce estimates of derivatives. This may lead to unacceptably large errors for higher-order derivatives (like $\gamma$, for example), unless statistical errors for option prices are very small. In the path integral approach there are no additional sources of errors.

TABLE 2

Option price sensitivities to input parameters. This table lists some of the price sensitivities which can be computed along the option price in a path-integral simulation. Initial stock value is set to S = 100 and the strike price is X = 100. Number of Monte Carlo steps is $1 \times 10^5$. Each parameter sensitivity estimate (suffix MC) is immediately followed by its error estimate $\epsilon$ and the exact value obtained by differentiation of the Black-Scholes formula. $\delta$ is the stock price sensitivity ($\delta = \partial C/\partial S$), $\kappa$ is the volatility sensitivity ($\kappa = \partial C/\partial \sigma$), and $\rho$ is the interest rate sensitivity ($\rho = \partial c/\partial r_f$).

| $N_t$ | $r_f$ | $\sigma^2$ | $\delta_{MC}$ | $\epsilon$ | $\delta$ | $\kappa_{MC}$ | $\epsilon$ | $\kappa$ | $\rho_{MC}$ | $\epsilon$ | $\rho$ |
|---|---|---|---|---|---|---|---|---|---|---|---|
| 1 | 0.004853 | 0.001875 | 0.5530 | 0.00039 | 0.5532 | 0.1143 | 0.0005 | 0.1141 | 0.04443 | 0.00005 | 0.04445 |
| 2 | 0.004853 | 0.001875 | 0.5745 | 0.00045 | 0.5750 | 0.1610 | 0.0006 | 0.1600 | 0.09083 | 0.00011 | 0.09092 |
| 3 | 0.004853 | 0.001875 | 0.5914 | 0.00049 | 0.5916 | 0.1949 | 0.0008 | 0.1942 | 0.13848 | 0.00019 | 0.13852 |
| 4 | 0.004853 | 0.001875 | 0.6060 | 0.00051 | 0.6054 | 0.2219 | 0.0010 | 0.2222 | 0.18710 | 0.00027 | 0.18692 |
| 5 | 0.004853 | 0.001875 | 0.6167 | 0.00053 | 0.6175 | 0.2469 | 0.0012 | 0.2463 | 0.23555 | 0.00035 | 0.23592 |
| 6 | 0.004853 | 0.001875 | 0.6276 | 0.00054 | 0.6283 | 0.2687 | 0.0013 | 0.2673 | 0.28485 | 0.00043 | 0.28539 |
| 7 | 0.004853 | 0.001875 | 0.6386 | 0.00055 | 0.6382 | 0.2867 | 0.0014 | 0.2862 | 0.33526 | 0.00052 | 0.33523 |
| 8 | 0.004853 | 0.001875 | 0.6474 | 0.00056 | 0.6473 | 0.3034 | 0.0016 | 0.3032 | 0.38522 | 0.00061 | 0.38536 |
| 9 | 0.004853 | 0.001875 | 0.6564 | 0.00057 | 0.6558 | 0.3179 | 0.0017 | 0.3188 | 0.43615 | 0.00071 | 0.43573 |
| 10 | 0.004853 | 0.001875 | 0.6635 | 0.00057 | 0.6638 | 0.3323 | 0.0018 | 0.3330 | 0.48614 | 0.00080 | 0.48627 |
| 11 | 0.004853 | 0.001875 | 0.6707 | 0.00057 | 0.6713 | 0.3451 | 0.0019 | 0.3461 | 0.53639 | 0.00089 | 0.53694 |
| 12 | 0.004853 | 0.001875 | 0.6772 | 0.00058 | 0.6784 | 0.3577 | 0.0021 | 0.3583 | 0.58630 | 0.00099 | 0.58771 |
| 1 | 0.004853 | 0.002500 | 0.5485 | 0.00035 | 0.5486 | 0.1146 | 0.0004 | 0.1143 | 0.043845 | 0.000045 | 0.043847 |
| 2 | 0.004853 | 0.002500 | 0.5682 | 0.00040 | 0.5685 | 0.1617 | 0.0006 | 0.1605 | 0.089164 | 0.000106 | 0.089227 |
| 3 | 0.004853 | 0.002500 | 0.5838 | 0.00044 | 0.5837 | 0.1960 | 0.0009 | 0.1950 | 0.135424 | 0.000174 | 0.135430 |
| 4 | 0.004853 | 0.002500 | 0.5966 | 0.00046 | 0.5964 | 0.2236 | 0.0010 | 0.2235 | 0.182223 | 0.000248 | 0.182195 |
| 5 | 0.004853 | 0.002500 | 0.6074 | 0.00048 | 0.6075 | 0.2490 | 0.0012 | 0.2481 | 0.229169 | 0.000324 | 0.229369 |
| 6 | 0.004853 | 0.002500 | 0.6167 | 0.00049 | 0.6175 | 0.2715 | 0.0013 | 0.2697 | 0.276238 | 0.000402 | 0.276847 |
| 7 | 0.004853 | 0.002500 | 0.6270 | 0.00050 | 0.6266 | 0.2901 | 0.0015 | 0.2892 | 0.324568 | 0.000488 | 0.324553 |
| 8 | 0.004853 | 0.002500 | 0.6354 | 0.00051 | 0.6350 | 0.3072 | 0.0016 | 0.3068 | 0.372574 | 0.000572 | 0.372425 |

TABLE 2-continued

Option price sensitivities to input parameters. This table lists some of the price sensitivities which can be computed along the option price in a path-integral simulation. Initial stock value is set to S = 100 and the strike price is X = 100. Number of Monte Carlo steps is $1 \times 10^5$. Each parameter sensitivity estimate (suffix MC) is immediately followed by its error estimate $\epsilon$ and the exact value obtained by differentiation of the Black-Scholes formula. $\delta$ is the stock price sensitivity ($\delta = \partial C/\partial S$), $\kappa$ is the volatility sensitivity ($\kappa = \partial C/\partial \sigma$), and $\rho$ is the interest rate sensitivity ($\rho = \partial c/\partial r_f$).

| $N_t$ | $r_f$ | $\sigma^2$ | $\delta_{MC}$ | $\epsilon$ | $\delta$ | $\kappa_{MC}$ | $\epsilon$ | $\kappa$ | $\rho_{MC}$ | $\epsilon$ | $\rho$ |
|---|---|---|---|---|---|---|---|---|---|---|---|
| 9 | 0.004853 | 0.002500 | 0.6433 | 0.00052 | 0.6428 | 0.3226 | 0.0017 | 0.3230 | 0.420538 | 0.000658 | 0.420414 |
| 10 | 0.004853 | 0.002500 | 0.6506 | 0.00052 | 0.6502 | 0.3373 | 0.0019 | 0.3380 | 0.468612 | 0.000745 | 0.468478 |
| 11 | 0.004853 | 0.002500 | 0.6569 | 0.00053 | 0.6572 | 0.3508 | 0.0020 | 0.3519 | 0.516353 | 0.000833 | 0.516584 |
| 12 | 0.004853 | 0.002500 | 0.6629 | 0.00053 | 0.6637 | 0.3641 | 0.0021 | 0.3648 | 0.563794 | 0.000929 | 0.564700 |

The possibility of computing Monte Carlo results for different parameters in a single simulation was discussed above. This is illustrated in Table 3, where option values in a window of about 10% variation of initial stock price are computed in a single run. Within a few percent difference from the stock price used in the simulation, results are roughly of the same statistical quality as for the original price. This is a very inexpensive and efficient way to explore option price variations in a limited parameter range, particularly if there is uncertainty about input parameter estimates. It is clear from Table 3 that the further one goes from the original simulation parameters, the worse the statistics become (larger relative errors) due to inefficient importance sampling.

We applied the path-integral Monte Carlo approach to the simple Black-Scholes model, where exact results are easy to obtain, to show the accuracy and efficiency of the method. The results indicate that this approach shows significant potential, which must be tested on realistic problems if it is to become a useful simulation tool. It is anticipated that an application of the method to various nontrivial models of underlying asset dynamics will prove valuable as well. To this end we show results for a jump diffusion model, where jumps are superimposed upon the continuous Wiener process. We consider the following differential/difference equation corresponding to this process:

$$d \log S = dy = \mu dt + \sigma d\xi + dZ$$

TABLE 3

Computation of option prices for multiple parameters in a single simulation. This table shows the level of accuracy which can be obtained if multiple option prices are computed in a single simulation. Number of Monte Carlo steps is $1 \times 10^5$, initial stock price is $S_o = 100$, strike price is X = 100, volatility per period is $\sigma^2 = 0.0025$, and riskless interest race is $r_f = 0.004853$ per period. Each option price estimate $C(S_i)$ for initial stock price $S_i$ is followed by its error estimate $\epsilon$ and the exact value from Black-Scholes formula C. $N_t$ denotes the number of time periods to maturity.

| $N_t$ | C(95) | $\epsilon$ | C | C(99) | $\epsilon$ | C | C(101) | $\epsilon$ | C | C(105) | $\epsilon$ | C |
|---|---|---|---|---|---|---|---|---|---|---|---|---|
| 1 | 0.4632 | 0.0006 | 0.4629 | 1.7364 | 0.0047 | 1.7325 | 2.8358 | 0.0117 | 2.8287 | 5.8448 | 0.0572 | 5.8540 |
| 2 | 1.1827 | 0.0051 | 1.1790 | 2.7907 | 0.0080 | 2.7757 | 3.9362 | 0.0154 | 3.9121 | 6.8103 | 0.0639 | 6.7915 |
| 3 | 1.8600 | 0.0098 | 1.8613 | 3.6494 | 0.0107 | 3.6390 | 4.8268 | 0.0183 | 4.8059 | 7.6560 | 0.0714 | 7.6377 |
| 4 | 2.5060 | 0.0145 | 2.5049 | 4.4087 | 0.0130 | 4.4080 | 5.6044 | 0.0207 | 5.6004 | 8.4129 | 0.0774 | 8.4160 |
| 5 | 3.1353 | 0.0192 | 3.1165 | 5.1283 | 0.0151 | 5.1164 | 6.3470 | 0.0230 | 6.3310 | 9.1655 | 0.0826 | 9.1444 |
| 6 | 3.7185 | 0.0232 | 3.7024 | 5.8019 | 0.0170 | 5.7813 | 7.0462 | 0.0251 | 7.0160 | 9.8878 | 0.0877 | 9.8342 |
| 7 | 4.2810 | 0.0269 | 4.2671 | 6.4267 | 0.0188 | 6.4133 | 7.6846 | 0.0271 | 7.6662 | 10.5269 | 0.0926 | 10.4933 |
| 8 | 4.8267 | 0.0312 | 4.8140 | 7.0248 | 0.0205 | 7.0191 | 8.2981 | 0.0288 | 8.2888 | 11.1462 | 0.0968 | 11.1270 |
| 9 | 5.3438 | 0.0345 | 5.3457 | 7.5966 | 0.0220 | 7.6032 | 8.8850 | 0.0305 | 8.8887 | 11.7508 | 0.1010 | 11.7393 |
| 10 | 5.8616 | 0.0380 | 5.8641 | 8.1616 | 0.0235 | 8.1691 | 9.4637 | 0.0321 | 9.4693 | 12.3372 | 0.1052 | 12.3334 |
| 11 | 6.3681 | 0.0415 | 6.3710 | 8.7055 | 0.0249 | 8.7194 | 0.0198 | 0.0336 | 10.0335 | 12.9117 | 0.1086 | 12.9115 |
| 12 | 6.8597 | 0.0450 | 6.8676 | 9.2435 | 0.0264 | 9.2561 | 0.5745 | 0.0352 | 10.5834 | 13.5007 | 0.1139 | 13.4755 |

The same trend is apparent for longer periods to maturity, because the differences between the simulation probability distribution and the true ones are amplified for longer time periods. For shorter periods to maturity, there is an apparent asymmetry between errors, which are much smaller for the initial prices below the simulation price $S_i < S_0$ than for prices above the simulation price, $S_i > S_0$. The reason is that the stock price distribution is skewed towards higher stock prices, so that the overlap between simulation price distribution and actual price distributions is bigger for $S_i < S_0$ than for $S_i > S_0$. This effect becomes less and less important for longer time periods to maturity.

where dZ is the stochastic variable describing the jump process. It is assumed that the number of jumps is Poisson distributed, while jump size is uniformly distributed with average <dZ>=0. The finite average of the jump size will amount to a trivial shift in the drift coefficient μ. A series solution has been obtained for the option price only under the assumption that the jump size distribution is normal. This restriction can be lifted in a Monte Carlo simulation; so we have chosen a uniform distribution for experimentation purposes, since it is computationally inexpensive and there is no analytic solution; this choice, however, is not intended as a limitation.

The results for a European call on an asset following this process are shown in Table 4. Prices and sensitivities are obtained concurrently, and the accuracy is comparable to that achieved on the Black-Scholes problem. Relative errors for $1 \times 10^5$ steps are below 1% for option price and below 0.2% for some $\delta$ and $\rho$ sensitivities. As for the Black-Scholes model, price sensitivities are more accurately determined than the option price itself. The relative quality of estimators depends upon the form of the corresponding function (see Eq. 15), which is integrated with respect to the path probability measure. If one computed sensitivities using numerical differentiation, errors would be at least as large as the price error.

tainties calculated by the Monte Carlo software based on the number of paths computed by the software.

It may be appreciated by one skilled in the art that additional embodiments may be contemplated, including systems and methods for simulating other financial parameters.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system and method illustrated and described herein are by way of example, and the scope of the invention is not limited to the exact details provided.

Having now described the invention, the operation and use of a preferred embodiment thereof, and the advantageous new and useful results obtained thereby, are set forth in the appended claims.

TABLE 4

Call option price and sensitivities for a jump diffusion process. This table lists results for the option price and its input parameter sensitivities when a jump process is superimposed on the continuous process of the Black-Scholes model. Initial stock value is set to S = 100 and the strike price is X = 100. Number of Monte Carlo steps is $1 \times 10^5$. Each Monte Carlo result is immediately followed by its error estimate $\epsilon$. Jump rate per period is set to $k_P = 0.1$. Riskless interest rate per period is $r_f = 0.004853$ and variance per period is $\sigma^2 = 0.001875$. Jump sizes are uniformly distributed in the interval ($-\Delta, +\Delta$). $\delta$ is the stock price sensitivity ($\delta = \partial C/\partial S$), $\kappa$ is the volatility sensitivity ($\kappa = \partial C/\partial \sigma$), and $\rho$ is the interest rate sensitivity ($\rho = \partial C/\partial r_f$).

| $N_t$ | $\Delta$ | C | $\epsilon$ | $\delta$ | $\epsilon$ | $\kappa$ | $\epsilon$ | $\rho$ | $\epsilon$ |
|---|---|---|---|---|---|---|---|---|---|
| 1 | 0.02 | 2.12671 | 0.01505 | 0.55233 | 0.00121 | 0.12487 | 0.00108 | 0.04426 | 0.00010 |
| 2 | 0.02 | 3.16259 | 0.02458 | 0.57517 | 0.00141 | 0.17626 | 0.00159 | 0.09059 | 0.00024 |
| 3 | 0.02 | 3.97857 | 0.03243 | 0.59134 | 0.00151 | 0.21151 | 0.00202 | 0.13789 | 0.00040 |
| 4 | 0.02 | 4.77069 | 0.03896 | 0.60583 | 0.00159 | 0.24485 | 0.00244 | 0.18604 | 0.00057 |
| 5 | 0.02 | 5.47055 | 0.04516 | 0.61457 | 0.00161 | 0.27364 | 0.00281 | 0.23328 | 0.00072 |
| 6 | 0.02 | 6.19997 | 0.05057 | 0.62528 | 0.00165 | 0.30257 | 0.00316 | 0.28164 | 0.00090 |
| 7 | 0.02 | 6.85696 | 0.05560 | 0.63553 | 0.00168 | 0.32708 | 0.00349 | 0.33073 | 0.00108 |
| 8 | 0.02 | 7.50037 | 0.06024 | 0.64449 | 0.00170 | 0.34980 | 0.00382 | 0.37966 | 0.00126 |
| 9 | 0.02 | 8.10141 | 0.06485 | 0.65231 | 0.00172 | 0.36877 | 0.00412 | 0.42847 | 0.00145 |
| 10 | 0.02 | 8.68738 | 0.06891 | 0.66075 | 0.00173 | 0.39014 | 0.00443 | 0.47823 | 0.00164 |
| 1 | 0.05 | 3.05180 | 0.02526 | 0.55565 | 0.00110 | 0.19220 | 0.00192 | 0.04376 | 0.00009 |
| 2 | 0.05 | 4.60908 | 0.04117 | 0.57536 | 0.00120 | 0.28671 | 0.00285 | 0.08821 | 0.00021 |
| 3 | 0.05 | 5.81127 | 0.05421 | 0.59300 | 0.00131 | 0.35139 | 0.00363 | 0.13372 | 0.00035 |
| 4 | 0.05 | 6.94802 | 0.06491 | 0.60581 | 0.00136 | 0.41691 | 0.00432 | 0.17878 | 0.00049 |
| 5 | 0.05 | 7.97130 | 0.07494 | 0.61854 | 0.00141 | 0.47293 | 0.00502 | 0.22451 | 0.00064 |
| 6 | 0.05 | 9.01019 | 0.08419 | 0.62963 | 0.00144 | 0.53323 | 0.00569 | 0.26977 | 0.00080 |
| 7 | 0.05 | 9.97512 | 0.09320 | 0.63949 | 0.00146 | 0.58649 | 0.00627 | 0.31485 | 0.00096 |
| 8 | 0.05 | 10.87057 | 0.10119 | 0.64944 | 0.00149 | 0.63476 | 0.00693 | 0.36049 | 0.00113 |
| 9 | 0.05 | 11.75562 | 0.10962 | 0.65942 | 0.00153 | 0.67822 | 0.00754 | 0.40639 | 0.00132 |
| 10 | 0.05 | 12.61027 | 0.11694 | 0.66944 | 0.00156 | 0.73089 | 0.00826 | 0.45278 | 0.00150 |

Figure 2:
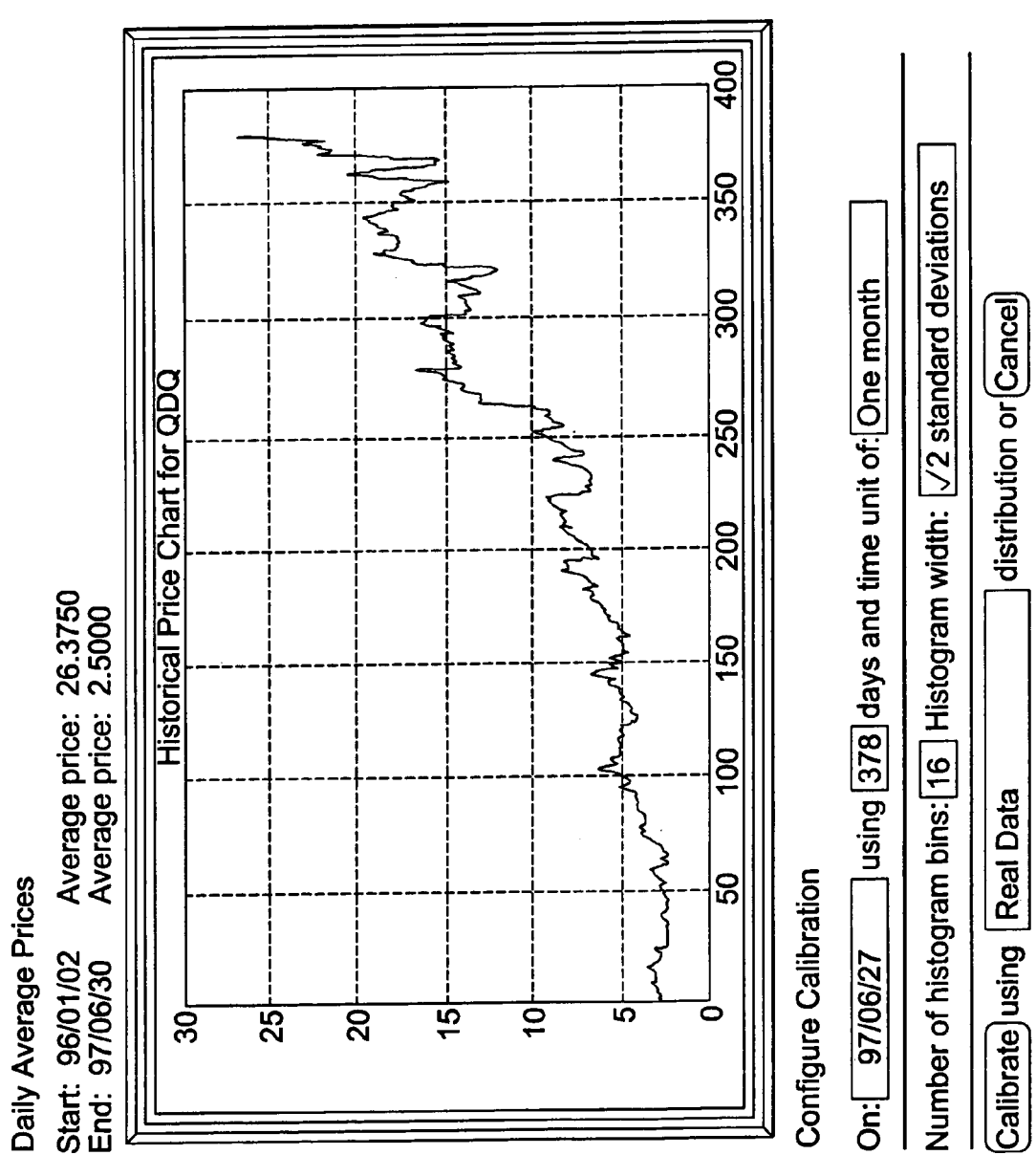
FIG. 2 represents exemplary system output showing the daily average price graph for a common stock and the user-specified variables used in the statistical software.

An exemplary set of output graphs is provided in FIGS. 2-5. In FIG. 2 is presented an example of the system's output displayed on a screen illustrating information on the underlying asset (here a common stock). Below the graph are displayed user-controllable variables associated with calculating the statistical quantities to be used by a portion of the pricing software subsystem.

Figure 3:
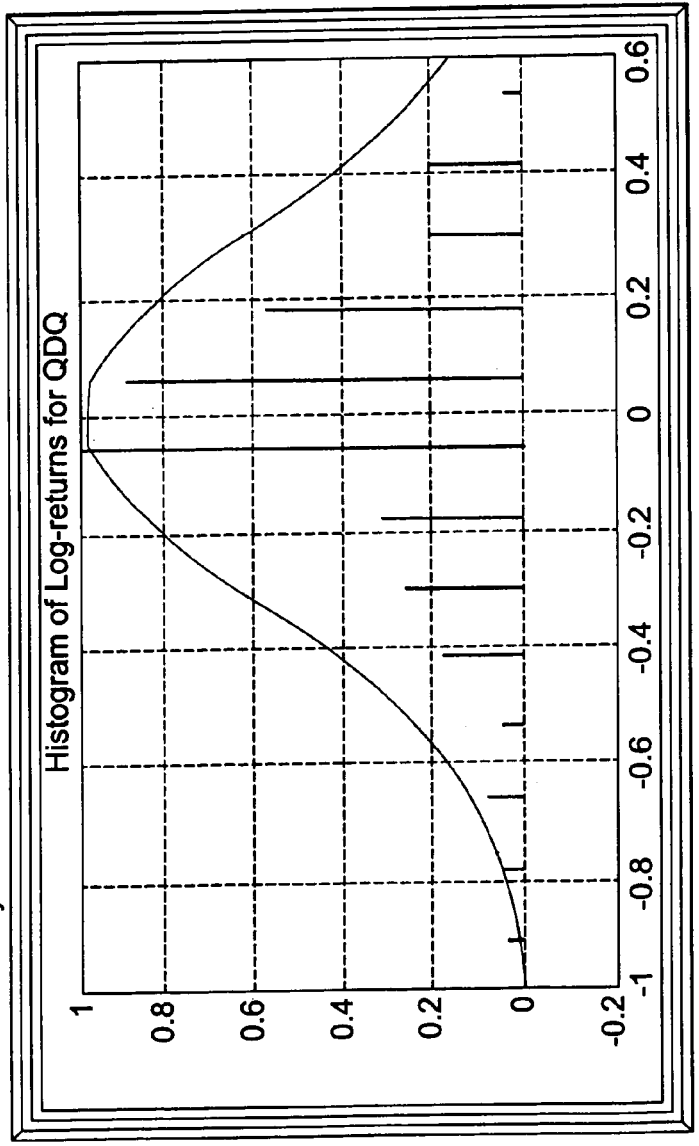
FIG. 3 represents exemplary system output showing a histogram of price changes and a Gaussian fit thereto.

In FIG. 3 is presented an example of the system's output displayed on a screen illustrating a histogram of price changes at particular time intervals together with a fitted curve depicting a best-fit Gaussian distribution to the given histogram. Below the graph is displayed information to be used in another portion of the pricing software subsystem.

Figure 4:
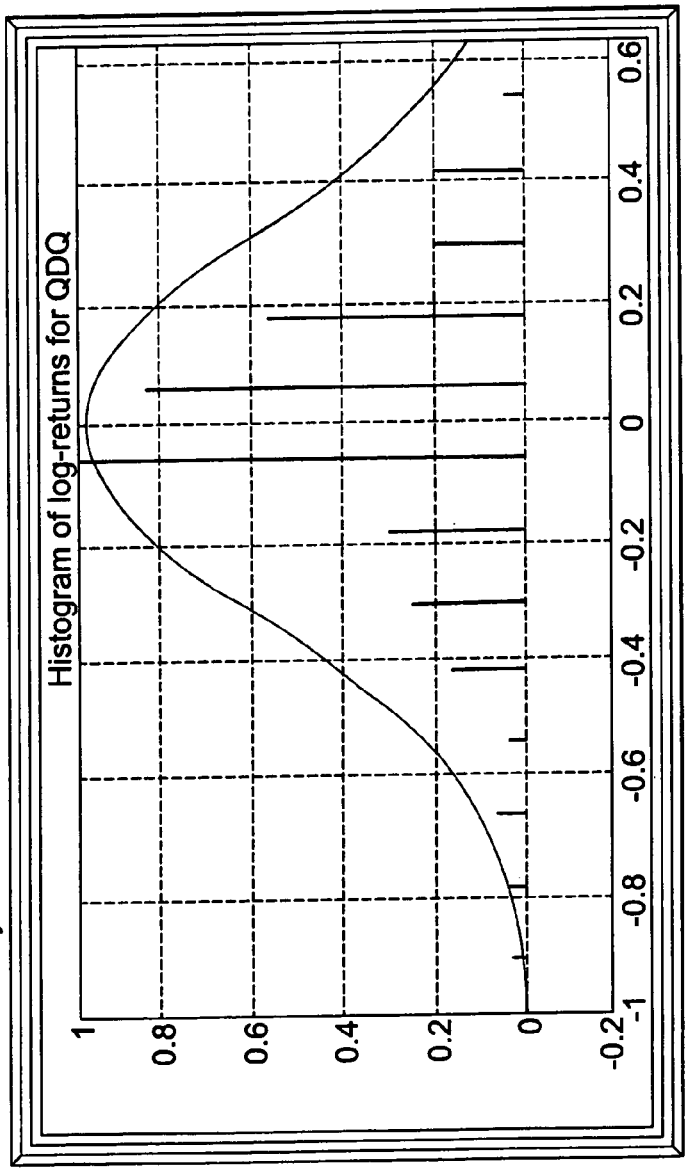
FIG. 4 represents exemplary system output showing histogram and real data fit.

In FIG. 4 the system displays the same information as in FIG. 3, while preparing to use an actual distribution rather than a Gaussian or other approximation to the histogram.

Figure 5:
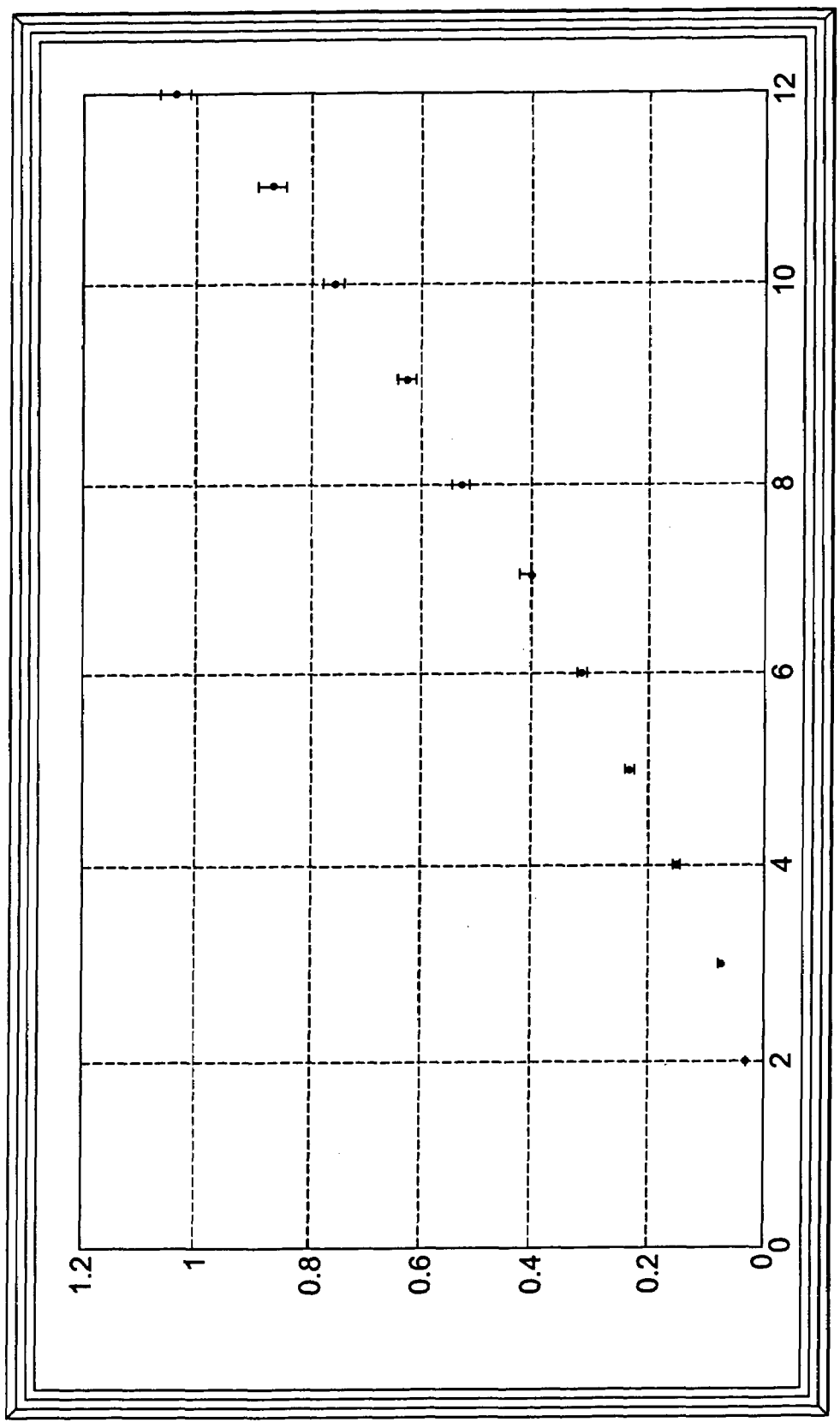
FIG. 5 represents exemplary system output showing calculated prices for an option on the stock of FIG. 2.

In FIG. 5 is exemplary output depicting the calculated prices for an option on the common stock of FIG. 2, with the stated stock and strike prices and for an expiration date after the date of the calculation. The error bars represent uncer-

What is claimed is:

1. A system for deriving an option price on an underlying asset comprising:
   a processor;
   software resident on a computer-readable medium accessible by the processor, the software comprising:
   a code segment for accessing a database of historical asset data; and
   a code segment for performing stochastic statistical sampling on the historical asset data for an option based upon an input parameter to derive an option price and a sensitivity to the input parameter in a single simulation by executing a Monte Carlo simulation algorithm representing an option price by a probability density calculated from the historical data in many-dimensional space at discrete times; and means for receiving and outputting the derived option price and the sensitivity to the user, the derived option price for assisting the user in making an investment decision.

2. The system recited in claim 1, wherein:

the accessing code segment further comprises a code segment for accessing a database of parameters of a plurality of asset probability distributions; and the performing code segment further comprises a code segment for performing stochastic statistical sampling of the asset probability distributions.

3. The system recited in claim 1, wherein the software further comprises a code segment for using a Metropolis algorithm to sample from the probability distribution.

4. The system recited in claim 3, wherein the option price depends upon a vector of state variables that is assumed to follow a Markov process.

5. The system recited in claim 4, wherein a collection of state variable vectors comprises a path followed thereby, and the option price is derived from a path integral over a set of paths over a probability distribution space.

6. The system recited in claim 5, wherein the path integral is approximated by a summation of payoffs of a subset of all possible paths of the state vector from an initial time to a final time, each path weighted by a probability of an occurrence of that path from a probability calculated from the historical data in many-dimensional space at discrete times.

7. The system recited in claim 6, wherein the subset of the possible paths is selected with the use of importance sampling.

8. The system recited in claim 7, wherein the path probability distribution is generated with a Metropolis method.

9. The system recited in claim 7, wherein the Metropolis method comprises constructing a Markov process in the path space.

10. The system recited in claim 9, wherein the Markov process is defined by a transition probability denoting a probability of reaching a second point in the path space from a first point in the path space, the transition probability ergodic and subject to a detailed balance condition.

11. A system for deriving an option price on an underlying asset comprising:

a processor;

software resident on a computer-readable medium accessible by the processor, the software comprising:

a code segment for accessing a database of historical asset data; and a code segment for performing stochastic statistical sampling on the historical asset data for an option based upon an input parameter to derive an option price and a sensitivity to the input parameter in a single simulation, including a code segment for representing the option price by a probability distribution described by a transition probability from a first continuous variable at a first discrete moment in time to a second continuous variable at a second discrete moment in time, the stochastic statistical sampling performed by executing a Monte Carlo simulation algorithm; and means for receiving and outputting the derived option price and the sensitivity to the user, the derived option price for assisting the user in making an investment decision.

12. A system for deriving an option price on an underlying asset comprising:

a processor;

software resident on a computer-readable medium accessible by the processor, the software comprising:

a code segment for accessing a database of historical asset data;

a code segment for representing stochastic historical data with a predetermined distribution; and a code segment for performing stochastic statistical sampling on the historical asset data for an option based upon an input parameter to derive an option price and a sensitivity to the input parameter in a single simulation, the stochastic statistical sampling performed with the use of a Monte Carlo simulation algorithm; and means for receiving and outputting the derived option price and the sensitivity to the user, the derived option price for assisting the user in making an investment decision.

13. The system recited in claim 12, wherein the predetermined distribution is selected from a group consisting of Gaussian, Cauchy, Poisson jump, a combination of Gaussian and Poisson jump, a combination of Cauchy and Poisson jump, and a histogram of historical data.

14. A system for deriving an option price on an underlying asset comprising:

a processor;

software resident on a computer-readable medium accessible by the processor and comprising code in a high-level data-parallel language comprising:

a code segment for accessing a database of historical asset data; and a code segment for performing stochastic statistical sampling on the historical asset data for an option based upon an input parameter to derive an option price and a sensitivity to the input parameter in a single simulation, the stochastic statistical sampling performed with the use of a Monte Carlo simulation algorithm; and means for receiving and outputting the derived option price and the sensitivity to the user, the derived option price for assisting the user in making an investment decision.

15. A system for deriving an option price on an underlying asset comprising:

a processor;

software resident on a computer-readable medium accessible by the processor, the software comprising:

a code segment for accessing a database of historical asset data;

a code segment for performing stochastic statistical sampling on the historical asset data for an option based upon an input parameter to derive an option price and a sensitivity to the input parameter in a single simulation, the stochastic statistical sampling performed with the use of a Monte Carlo simulation algorithm;

a code segment for controlling a means for communicating with a telecommunications network; and means for receiving and outputting the derived option price and the sensitivity to the user, the derived option price for assisting the user in making an investment decision.

16. A system for deriving an option price on an underlying asset comprising:

a processor;

software resident on a computer-readable medium accessible by the processor, the software comprising:

a code segment for accessing a database of historical asset data; and a code segment for performing stochastic statistical sampling on the historical asset data for an option based upon an input parameter to derive an option price and a sensitivity to the input parameter in a single simulation, the stochastic statistical sampling performed with the use of a Monte Carlo simulation algorithm, wherein the input parameter comprises at least one of an underlying asset, a risk-free interest rate, a date, an asset price, or a strike price; and means for receiving and outputting the derived option price and the sensitivity to the user, the derived option price for assisting the user in making an investment decision.

17. A system for deriving an option price on an underlying asset comprising:

a processor;

software resident on a computer-readable medium accessible by the processor, the software comprising:

a code segment for accessing a database of historical asset data and current data on an asset; and a code segment for performing stochastic statistical sampling on the historical asset data for an option based upon an input parameter to derive an option price and a sensitivity to the input parameter in a single simulation, the stochastic statistical sampling performed with the use of a Monte Carlo simulation algorithm; and means for receiving and outputting the derived option price and the sensitivity to the user, the derived option price for assisting the user in making an investment decision.

18. The system recited in claim 17, wherein the accessing code segment comprises a code segment for communicating with a financial data vendor.

19. The system recited in claim 18, wherein the accessing code segment further comprises a code segment for adding current data on an asset into the database server for combining with the historical data.

20. A system for deriving an option price on an underlying asset comprising:

a processor;

software resident on a computer-readable medium accessible by the processor, the software comprising:

a code segment for accessing a database of historical asset data; and a code segment for performing stochastic statistical sampling on the historical asset data for an option based upon an input parameter to derive an option price and a sensitivity to the input parameter in a single simulation, the stochastic statistical sampling performed with the use of a Monte Carlo simulation algorithm; and a second software resident on the computer-readable medium for computing a price sensitivity parameter comprising at least one of a sensitivity to a change in an underlying price, a sensitivity to a change in an underlying volatility, a sensitivity to a change in a money market rate, a sensitivity to a passage of time, and a sensitivity to a dividend yield for a stock option; and means for receiving and outputting the derived option price and the sensitivity to the user, the derived option price for assisting the user in making an investment decision.

21. A system for deriving an option price on an underlying asset comprising:

a processor;

software resident on a computer-readable medium accessible by the processor, the software comprising:

a code segment for accessing a database of historical asset data; and a code segment for performing stochastic statistical sampling on the historical asset data for an option based upon an input parameter to derive an option price and a sensitivity to the input parameter in a single simulation, the stochastic statistical sampling performed with the use of a Monte Carlo simulation algorithm; and a third software resident on the computer-readable medium for computing a statistical analysis of the historical data; and means for outputting the derived option price and the sensitivity to the user, the derived option price for assisting the user in making an investment decision.

22. The system recited in claim 21, wherein the statistical analysis comprises at least one of a histogram, a detrending, a correlation, a spectral analysis, a calculation of moments, a moment substitution estimation, a weighted historical volatility estimation, a robustness statistic, and a maximum likelihood estimation.

23. A system for deriving an option price on an underlying asset comprising:

a processor;

software resident on a computer-readable medium accessible by the processor, the software comprising:

a code segment for accessing a database of historical asset data; and a code segment for performing stochastic statistical sampling on the historical asset data for an option based upon an input parameter to derive an option price and a sensitivity to the input parameter in a single simulation, the stochastic statistical sampling performed with the use of a Monte Carlo simulation algorithm; and a fourth software resident on the computer-readable medium for computing an implied volatility by means of a Black-Scholes model and the current data on the asset; and means for receiving and outputting the derived option price and the sensitivity to the user, the derived option price for assisting the user in making an investment decision.

24. A system for deriving an option price on an underlying asset comprising:

a processor;

software resident on a computer-readable medium accessible by the processor, the software comprising:

a code segment for accessing a database of historical asset data comprising at least one of an option price or an option volume correlated with time; and a code segment for performing stochastic statistical sampling on the historical asset data for an option based upon an input parameter to derive an option price and a sensitivity to the input parameter in a single simulation, the stochastic statistical sampling performed with the use of a Monte Carlo simulation algorithm; and means for receiving and outputting the derived option price and the sensitivity to the user, the derived option price for assisting the user in making an investment decision.

25. A system for assisting a user to make an investment decision comprising:
  a user computer having a processor and storage, input, and output means and means for accessing a network, all in electronic communication with the processor;
  software resident on the storage means for deriving an option price on an underlying asset comprising:
  a code segment for accessing a database of historical asset data via the network accessing means;
  a code segment for representing stochastic historical data with a predetermined distribution; and
  a code segment for performing stochastic statistical sampling on the historical asset data for an option based upon an input parameter entered by a user via the input means to derive an option price in a single simulation, the stochastic statistical sampling performed with the use of a Monte Carlo simulation algorithm; and
  means for outputting the derived option price to the user via the output means, the derived option price for assisting the user in making an investment decision.

26. A system for assisting a user to make an investment decision comprising:
  a computation center having a processor and storage means and network accessing means, both in electronic communication with the processor;
  software resident on the storage means for deriving an option price on an underlying asset comprising:
  a code segment for accessing a database of historical asset data via the network accessing means; and
  a code segment for performing stochastic statistical sampling on the historical asset data for an option based upon an input parameter entered by a user at a remote location and directed to the computation center via the network accessing means, adapted to derive an option price in a single simulation, the stochastic statistical sampling performed with the use of a Monte Carlo simulation algorithm, wherein the input parameter comprises at least one of an underlying asset, a risk-free interest rate, a date, an asset price, or a strike price; and
  means for outputting the derived option price to the user via the network accessing means, the derived option price for assisting the user in making an investment decision.

27. A method for assisting a user in making a decision to purchase an option comprising the steps of:
  accessing a computer and entering an input parameter for a desired option;
  accessing a database server having resident thereon historical data on an option, on an asset underlying the option, and on parameters of a plurality of asset probability distributions;
  performing on the computer a stochastic statistical sampling by executing a Monte Carlo simulation algorithm on the historical asset data and on the asset probability distribution retrieved from the database server for an option based upon the input parameter to derive an option price, a sensitivity to the input parameter, and an implied volatility in a single simulation, the algorithm execution comprising representing an option price by a probability density calculated from the historical data in many-dimensional space at discrete times; and
  outputting the derived option price and the implied volatility to a user for assisting the user to make a decision as to purchasing the option.

28. The method recited in claim 27, further comprising the step of using a Metropolis algorithm to sample from the probability distribution.

29. The method recited in claim 28, wherein the option price depends upon a vector of state variables that is assumed to follow a Markov process.

30. The method recited in claim 29, wherein a collection of state variable vectors comprises a path followed thereby, and the option price is derived from a path integral over a set of paths over a probability distribution space.

31. The method recited in claim 30, wherein the path integral is approximated by a summation of payoffs of a subset of all possible paths of the state vector from an initial time to a final time, each path weighted by a probability of an occurrence of that path from a probability calculated from the historical data in many-dimensional space at discrete times.

32. A software package encoded on a computer-readable medium, the software package for deriving an option price on an underlying asset and comprising code segments for:
  accessing a database of historical asset data;
  performing stochastic statistical sampling on the historical asset data for an option based upon an input parameter to derive an option price and a sensitivity to the input parameter in a single simulation by executing a Monte Carlo simulation algorithm representing an option price by a probability density calculated from the historical data in many-dimensional space at discrete times; and
  sending to an output device the derived option price and the sensitivity to the user, the derived option price for assisting the user in making an investment decision.

* * * * *